United States Patent
Sonoda et al.

(10) Patent No.: US 9,288,412 B2
(45) Date of Patent: Mar. 15, 2016

(54) IMAGE PICKUP APPARATUS, METHOD FOR DRIVING IMAGE PICKUP APPARATUS, IMAGE PICKUP SYSTEM

(71) Applicant: CANON KABUSHIKI KAISHA, Tokyo (JP)

(72) Inventors: Kazuhiro Sonoda, Yokohama (JP); Shintaro Takenaka, Yokohama (JP); Atsushi Furubayashi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 269 days.

(21) Appl. No.: 13/893,035

(22) Filed: May 13, 2013

(65) Prior Publication Data
US 2013/0308024 A1    Nov. 21, 2013

(30) Foreign Application Priority Data
May 15, 2012  (JP) .................. 2012-111864

(51) Int. Cl.
*H04N 3/14* (2006.01)
*H04M 1/78* (2006.01)
*H04N 5/378* (2011.01)

(52) U.S. Cl.
CPC .................................. *H04N 5/378* (2013.01)

(58) Field of Classification Search
CPC ....... H03M 1/12; H03M 1/1215; H03M 3/30; H03M 1/002; H03M 1/365; H04N 5/335; H04N 3/155; H04N 5/378; H04N 3/1512; H01L 27/14643
USPC .................................. 348/294–308; 341/155
See application file for complete search history.

(56) References Cited

U.S. PATENT DOCUMENTS

2011/0080507 A1*  4/2011  Iwasa ............................ 348/302

FOREIGN PATENT DOCUMENTS

JP        2011-217206 A    10/2011

* cited by examiner

*Primary Examiner* — Sinh Tran
*Assistant Examiner* — Selam Gebriel
(74) *Attorney, Agent, or Firm* — Canon USA, Inc. IP Division

(57) ABSTRACT

There is provided an image pickup apparatus which outputs a digital signal based on a comparison result signal that changes the signal value at Nth (where N is an integer of 1 or higher) among comparison result signals output by a plurality of comparators.

17 Claims, 15 Drawing Sheets

IMAGE PICKUP APPARATUS, METHOD FOR DRIVING IMAGE PICKUP APPARATUS, IMAGE PICKUP SYSTEM

BACKGROUND OF THE INVENTION

1. Field of the Invention

The present invention relates to image pickup apparatuses having pixels including photoelectric conversion units and analog-digital converting units.

2. Description of the Related Art

From the past, an image pickup apparatus has been known which includes a pixel part having pixels in a matrix form which perform photoelectric conversion and output a signal based on incident light and a column array analog-digital converting part having analog-digital converting units corresponding to columns of pixels (hereinafter, an analog-digital converting unit will be called an ADC (Analog Digital Converter) and a column array ADC will be called a column ADC. In the column ADC, an ADC of each column performs analog-digital conversion (hereinafter will be called AD conversion) which converts an analog signal output from a pixel (hereinafter called a pixel signal) to a digital signal.

An example of the column ADC which has been known has a plurality of comparators which compare a ramp signal and a pixel signal and a counter which counts clock pulse signals. Japanese Patent Laid-Open No. 2011-217206 discloses an image pickup apparatus having a column ADC which compares signals output by a plurality of comparators.

Japanese Patent Laid-Open No. 2011-217206 discloses an image pickup apparatus including a first pixel, a second pixel, a first comparator provided for the first pixel and a second comparator provided for the second pixel, and a difference circuit connected to the first comparator and the second comparator, and a counter. The counter counts clock pulse signals on the basis of a difference signal output from the difference circuit and thus generations a count signal. A comparison result signal output by the first comparator is a signal indicative of a result of a comparison between a signal output from the first pixel and a ramp signal that is a signal having a potential that changes depending on a time. In the same manner, a comparison result signal output from the second comparator is a signal indicative of a result of a comparison between a signal output from the second pixel and a ramp signal. The difference circuit outputs to a counter a difference signal that is a signal which operates the counter during a period from a change of a signal value of a comparison result signal that is a signal indicative of a one comparison result by the first or second comparator to an inversion of the other comparison result signal. The counter counts clock pulse signals during a period while a difference signal is being output from the difference circuit.

SUMMARY OF THE INVENTION

One aspect of the present invention is an image pickup apparatus including a plurality of pixels which are arranged in a matrix form and output a pixel signal, a plurality of comparators which are provided correspondingly to columns of the matrix, each comparator is configured to output a comparison result signal having a signal value resulting from a comparison between a signal based on the pixel signal and a signal having a potential that changes depending on time, and a holding unit which holds a count signal acquired by counting a clock pulse signal, the holding unit is configured to hold the count signal based on the comparison result signal that changes the signal value at Nth (where N is an integer of 1 or higher) among the comparison result signals output by the plurality of comparators.

According to another aspect, there is provided an image pickup apparatus including a plurality of pixels which are arranged in a matrix form and output a pixel signal, a plurality of comparators which are provided correspondingly to columns of the matrix, each comparator is configured to output a comparison result signal having a signal value resulting from a comparison between a signal based on the pixel signal and a signal having a potential that changes depending on time, a holding unit which holds a count signal acquired by counting a clock pulse signal, and a control unit which causes the holding unit to hold the count signal based on the comparison result signal that changes the signal value at Nth (where N is an integer of 1 or higher) among the comparison result signals output by the plurality of comparators.

According to another aspect, there is provided a method for driving an image pickup apparatus having a plurality of pixels which are arranged in a matrix form and output a pixel signal, a plurality of comparators which are provided correspondingly to columns of the matrix, each comparator is configured to output comparison result signals each having a signal value resulting from a comparison between a signal based on the pixel signal and a signal having a potential that changes depending on time, and a holding unit which holds a count signal acquired by counting clock pulse signals, the method including causing the holding unit to hold the count value based on the comparison result signal that changes the signal value at Nth (where N is an integer of 1 or higher) among the comparison result signals output by the plurality of comparators.

Further features of the present invention will become apparent from the following description of exemplary embodiments with reference to the attached drawings.

DESCRIPTION OF THE EMBODIMENTS

First Embodiment

The image pickup apparatus disclosed in Japanese Patent Laid-Open No. 2011-217206 has not studied an image pickup apparatus which outputs a digital signal based on a comparison result signal that changes the signal value at Nth (where N is an integer of 1 or higher) among comparison result signals output by a plurality of comparators. The imaging apparatus described below was made in order to solve the problem.

An image pickup apparatus according to a first embodiment will be described below with reference to drawings.

Figure 1:
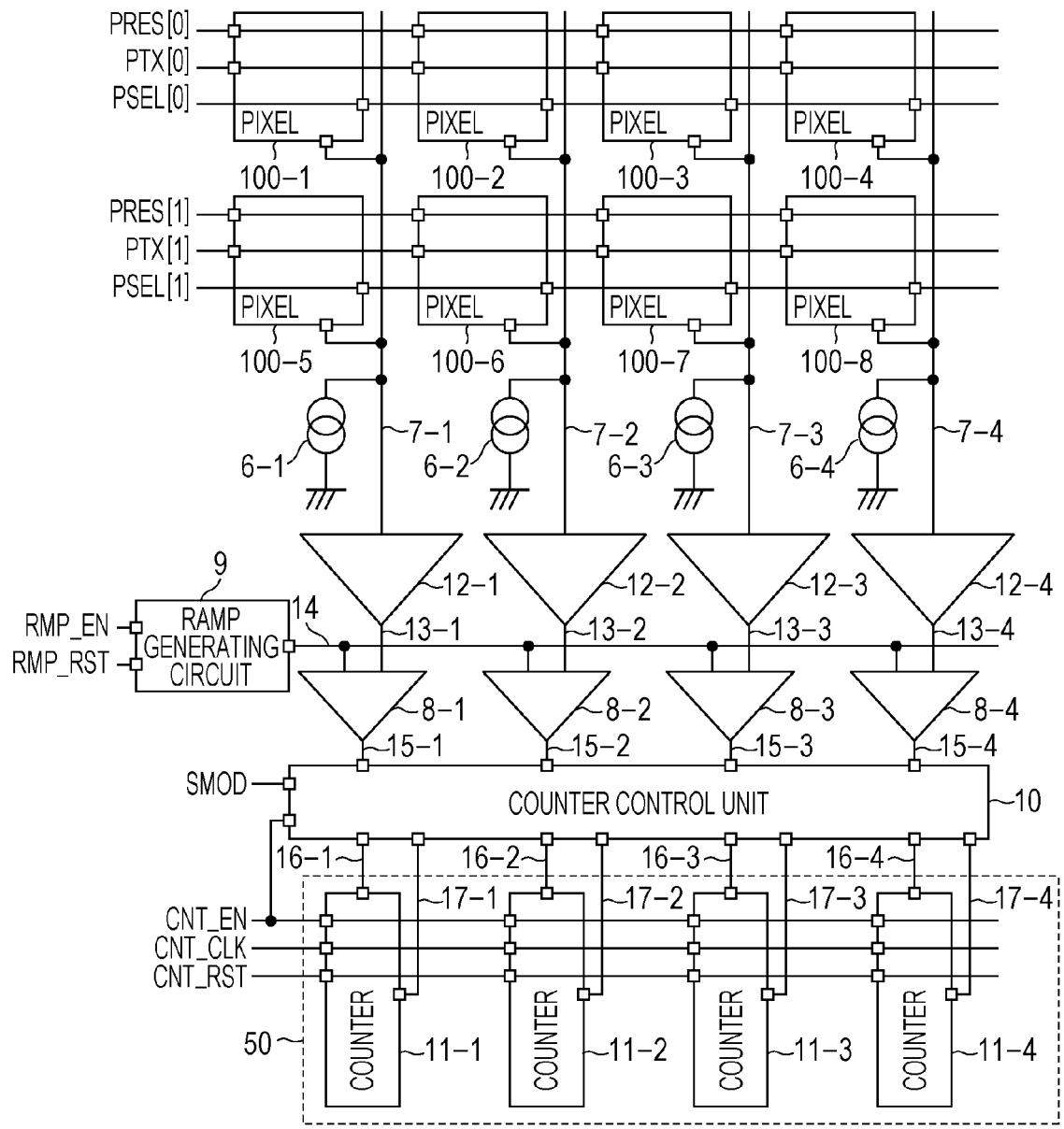
FIG. 1 is a block diagram of an example of an image pickup apparatus.

FIG. 1 is a block diagram illustrating an example of an image pickup apparatus of this embodiment.

The image pickup apparatus has a plurality of pixels 100-1 to 100-8 arranged in matrix form. FIG. 1 schematically illustrates 2 rows and 4 columns of pixels 100. The pixels 100 in each column output signals to first vertical signal lines 7-1 to 7-4. The first vertical signal lines 7-1 to 7-4 receive current fed from current sources 6-1 to 6-4, respectively. The signals output from the pixels 100 to the first vertical signal lines 7-1 to 7-4 are output to terminals of inverting amplifiers 12-1 to 12-4, respectively. The potentials of the first vertical signal lines 7-1 to 7-4 will be denoted by VL1 to VL4, respectively. The signal output from the inverting amplifiers 12-1 to 12-4 are given to terminals of comparators 8-1 to 8-4 through second vertical signal lines 13-1 to 13-4, respectively. The potentials of the second vertical signal lines 13-1 to 13-4 will be denoted by CA1 to CA4, respectively. The other terminals of the comparators 8-1 to 8-4 receive a ramp signal RMP from a ramp generating circuit 9 through a ramp signal supply line 14. Comparison result signals output from the comparators 8-1 to 8-4 are output to a counter control unit 10 through comparison result signal transmission lines 15-1 to 15-4, respectively. A first pulse transmission line 16 transmits pulses CEN from a counter control unit 10 to a counter 11. A second pulse transmission line 17 transmits pulses CMOD from the counter control unit 10 to the counter 11. The comparators 8-1 to 8-4 and counters 11-1 to 11-4 are provided correspondingly to the columns of the pixels 100. The holding unit 50 in the image pickup apparatus illustrated in FIG. 1 includes the counters 11-1 to 11-4. The counter control unit 10 is provided on a path from the plurality of comparators 8-1 to 8-4 to the holding unit 50.

The pixels 100 receive pulses PRES, PTX, and PSEL from vertical scanning circuits, not illustrated. Each of the pulses output from the vertical scanning circuit to the first row is indicated by [0] at the end of a reference that denotes a pulse. Each of the pulses output from the vertical scanning circuit to the second row is indicated by [1] at the end of a reference that denotes a pulse. The ramp generating circuit 9 receives pulses RMP_EN and RMP_RST from a timing generator, not illustrated. The counter control unit 10 receives a pulse SMOD from a timing generator, not illustrated. The counters 11-1 to 11-4 receive pulses CNT_EN, CNT_CLK, and CNT_RST from a timing generator, not illustrated. The counter 11-1 receives pulse CEN1 and CMOD1 from the counter control unit 10. In the same manner, the counters 11-2 to 11-4 receive pulses CEN2 to CEN4 and pulses CMOD2 to CMOD4, respectively, from the counter control unit 10.

Figure 2:
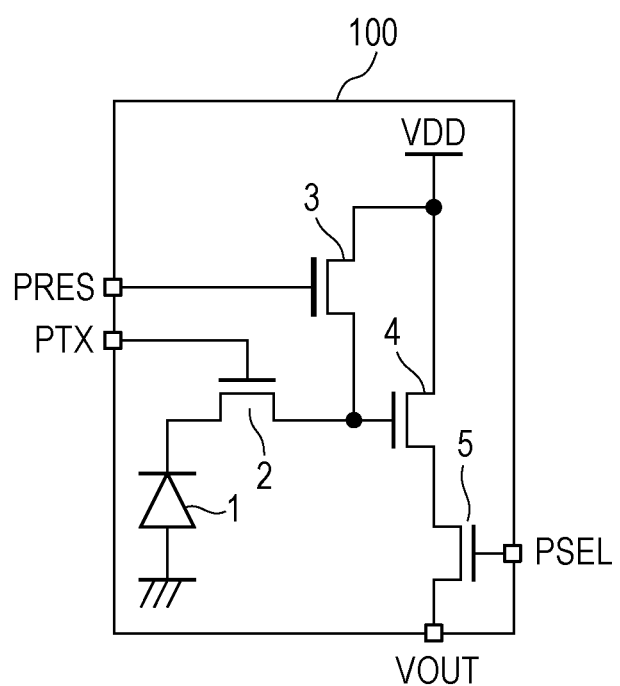
FIG. 2 is an equivalent circuit diagram of an example of a pixel in an image pickup apparatus.

Next, the pixels 100 of this embodiment will be described with reference to FIG. 2.

Each of the pixels 100 includes a photodiode 1, a transfer MOS transistor 2, a reset MOS transistor 3, an amplification MOS transistor 4, and a select MOS transistor 5.

The photodiode 1 generates signal charges in accordance with the quantity of incident light. The photodiode 1 is a photoelectric conversion unit. When a pulse PTX which controls conduction of the transfer MOS transistor 2 has a High level (hereinafter called H level, while a Low level will be called L level), the signal charges generated by the photodiode 1 is transferred to a node of a control electrode of the amplification MOS transistor 4. This node will be called an FD portion (FD stands for floating diffusion). When a pulse PSEL which controls conduction of the select MOS transistor 5 reaches H level, a signal is output from the amplification MOS transistor 4 to the vertical signal line 7 through the select MOS transistor 5. A pulse PRES which controls conduction of the reset MOS transistor 3 reaches H level, the potential of the FD portion is reset in accordance with the potential of power supply VDD.

Figure 3:
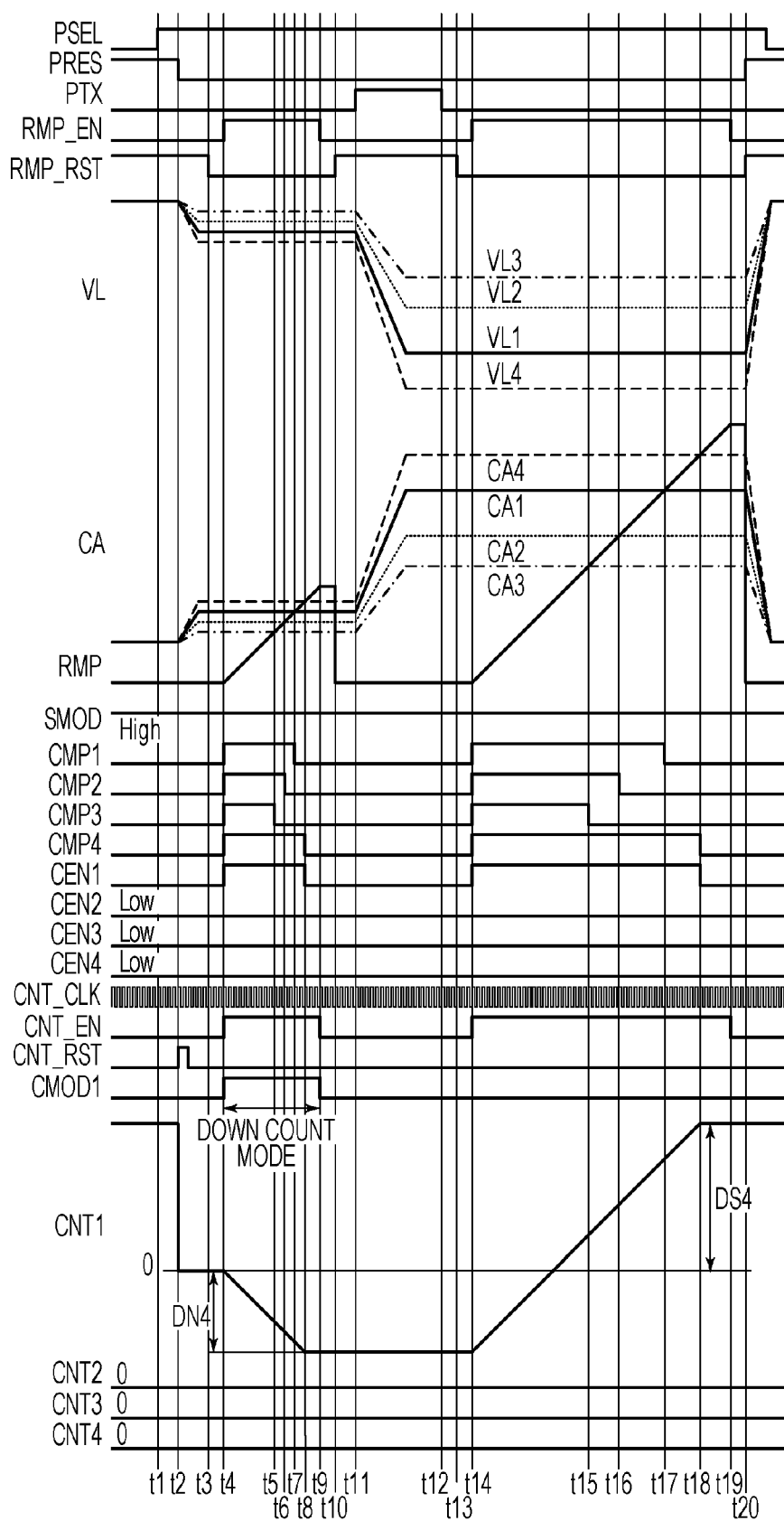
FIG. 3 is a timing chart illustrating an example of an operation of an image pickup apparatus.

FIG. 3 is a timing chart illustrating an example of an operation of the image pickup apparatus illustrated in FIG. 1. In the image pickup apparatus exemplarily illustrated in FIG. 1, the counter 11-1 operates on the basis of a comparison result signal CMP that changes the signal value at a predetermined position among the comparison result signals CMP1, CMP2, CMP3, and CMP4 output from the four comparators 8-1, 8-2, 8-3, and 8-4. The counter 11-1 is a first counter which holds a count signal based on a comparison result signal having a change at an Nth signal value according to this embodiment. The predetermined position refers to at least one of first to fourth according to this embodiment. In the operation which will be described below, the pulse CEN2, CEN3, and CEN4 output by the counter control unit 10 have L level at all times, and the counters 11-2, 11-3, and 11-4 are thus disabled. The counters 11-2, 11-3, and 11-4 are second counters which may be disabled during a period when the first counter is performing an operation of counting clock pulse signals. A control unit causing the holding unit to hold a count signal is the counter control unit 10 in the image pickup apparatus exemplarily illustrated in FIG. 1.

First, an operation in which the counter 11-1 is enabled on the basis of a comparison result signal CMP that changes the signal value at last among the comparison result signals CMP1, CMP2, CMP3, and CMP4 will be described below. The signal amplitudes of the vertical signal lines 7-1 to 7-4 have a relationship of VL3<VL2<VL1<VL4 in the operation which will be described below. The term signal amplitude here refers to the amount of change from a reference potential of the vertical signal line 7 when the pixel 100 does not output a signal. The term reference potential of the vertical signal line 7 refers to the potential before time t1 in the operation in FIG. 3, which will be described below. Correspondingly, the signal amplitudes of the inverting amplification signal lines 13-1 to 13-4 have a relationship of CA3<CA2<CA1<CA4.

At the time t1, the signal level of the pulse PSEL is changed to H level. The pulses PRES, RMP_RST, and SMOD are at H level. The H level of the pulse PRES shifts the potential of the FD portion, that is, the potential of the control electrode of the amplification MOS transistor 4 to a reset level. The comparison result signals CMP1 to CMP4, CEN1, CNT_EN, CNT_RST, and CMOD1 are at L level.

At a time t2, the signal level of the pulse CNT_RST is changed to H level, and the count signal of the counter 11-1 is thus reset. The signal level of the pulse PRES is changed to L level, which cancels the reset of the potential of the FD portion. The signals output from the pixels 100-1 to 100-4 to the first vertical signal lines 7-1 to 7-4, respectively, at that time will be called signals AN1 to AN4. The signal output from the inverting amplifiers 12-1 to 12-4 to the comparators 8-1 to 8-4 on the basis of the signals AN1 to AN4 will be called signals GN1 to GN4. The signals AN1 to AN4 are noise level signals output as a result of the reset level of the potential of the FD portion, that is the potential of the control electrode of the amplification MOS transistor 4. A signal GN output by the inverting amplifier 12 is based on one signal AN of pixel signals.

At a time t3, the signal level of the pulse RMP_RST is changed to L level, which cancels the reset of the potential of the ramp signal RMP.

At a time t4, the signal level of the pulse RMP_EN is changed to H level. This starts a change in potential depending on the time of the ramp signal RMP. The signal level of the pulse CNT_EN is also changed to H level. The counter control unit 10 changes the pulse CEN1 to H level. The counter 11-1 counts clock pulse signals CNT_CLK when both of the pulse CNT_EN and pulse CE1 are at H level. The counter control unit 10 also changes the signal level of the pulse CMOD1 to H level. Thus, the counter 11-1 reduces the count signal value in accordance with a result of counting the clock pulse signal CNT_CLK. The operation of the counter 11 for setting the pulse CMOD1 at H level and reducing the count signal value in accordance with a result of counting the clock pulse signal CNT_CLK will be called down count. The comparison result signals CMP1 to CMP4 are at H level.

At a time t5, the magnitude relationship between the potential CA3 of the inverting amplification signal line 13-3 and the potential of the ramp signal RMP is inverted, and the comparison result signal CMP3 is changed to L level. The comparison result signals CMP1, CMP2, and CMP4 are continuously at H level.

At a time t6, the magnitude relationship between the potential CA2 of the inverting amplification signal line 13-2 and the potential of the ramp signal RMP is inverted, and the comparison result signal CMP2 is changed to L level. The comparison result signals CMP1 and CMP4 are continuously at H level.

At a time t7, the magnitude relationship between the potential CA1 of the inverting amplification signal line 13-1 and the potential of the ramp signal RMP is inverted, and the comparison result signal CMP1 is changed to L level. The comparison result signal CMP4 is continuously at H level.

At a time t8, the magnitude relationship between the potential CA4 of the inverting amplification signal line 13-4 and the potential of the ramp signal RMP is inverted, and the comparison result signal CMP4 is changed to L level. At that time, the comparison result signals CMP1 to CMP4 are all at L level. Thus, the counter control unit 10 changes the signal level of the pulse CEN1 to L level. Thus, the counter 11-1 finishes counting the clock pulse signal CNT_CLK. The count signal held in the counter 11-1 is a digital signal based on the signal GN4 having a high signal amplitude among the signals GN1 to GN4. This digital signal will be called a signal DN4.

At a time t9, the signal level of the pulse RMP_EN is changed to L level. Thus, the change of the potential depending on the time of the ramp signal RMP ends. Both of signal levels of the pulses CNT_EN and CMOD1 are changed to L level. During the period from the time t4 to the time t9, a first comparison is performed which compares between a signal based on a noise level signal and a ramp signal.

At a time t10, the signal level of the pulse RMP_RST is changed to H level, and the potential of the ramp signal RMP is thus reset.

At a time t11, the signal level of the pulse PTX is changed to H level.

At a time t12, the signal level of the pulse PTX is changed to L level. The signals output from the pixels 100-1 to 100-4 to the vertical signal lines 7-1 to 7-4, respectively, will be called signals A(S+N)1 to A(S+N)4. The signals output from the inverting amplifiers 12-1 to 12-4 to the comparators 8-1 to 8-4 on the basis of the signals A(S+N)1 to A(S+N)4 will be called signals G(S+N)1 to G(S+N)4. The signal A(S+N) is a photoelectric conversion signal output on the basis of signal charges generated by the photodiode 1. The signal G(S+N) output from the inverting amplifier 12 is based on one photoelectric conversion signal of pixel signals.

At a time t13, the signal level of the pulse RMP_RST is changed to L level, which cancels the reset of the potential of the ramp signal RMP.

At a time t14, the signal level of the pulse RMP_EN is changed to H level, which starts the change of the potential depending on the time of the ramp signal RMP. The counter 11-1 holds a count signal when the signal level of the pulse CNT_EN is changed to L level at the time t9. The signal level of the pulse CNT_EN is changed to H level. The signal level of the pulse CEN1 is also changed to H level. The counter 11-1 starts counting the clock pulse signal CNT_CLK from the count signal value held at the time t9. The signal level of the pulse CMOD1 is at L level. Thus, the count signal value counted by the counter 11-1 increases in accordance with a result of counting the clock pulse signal CNT_CLK. The operation of the counter 11 for changing the signal level of the pulse CMOD1 to L level and increasing the count signal value in accordance with a result of counting the clock pulse signal CNT_CLK will be called up count. The comparison result signals CMP1 to CMP4 are at H level.

At a time t15, the magnitude relationship between the potential CA3 of the inverting amplification signal line 13-3 and the potential of the ramp signal RMP is inverted, and the comparison result signal CMP3 is changed to L level. The other comparison result signals CMP1, CMP2, and CMP4 are continuously at H level.

At a time t16, the magnitude relationship between the potential CA2 of the inverting amplification signal line 13-2 and the potential of the ramp signal RMP is inverted, and the comparison result signal CMP2 is changed to L level. The comparison result signals CMP1 and CMP4 are continuously at H level.

At a time t17, the magnitude relationship between the potential CA1 of the inverting amplification signal line 13-1 and the potential of the ramp signal RMP is inverted, and the comparison result signal CMP1 is changed to L level. The comparison result signal CMP4 is continuously at H level.

At a time t18, the magnitude relationship between the potential CA4 of the inverting amplification signal line 13-4 and the potential of the ramp signal RMP is inverted, and the comparison result signal CMP4 is changed to L level. At that time, the comparison result signals CMP1 to CMP4 are all an L level. This, the counter control unit 10 changes the signal level of the pulse CEN1 at L level. As a result, the counter 11-1 finishes counting the clock pulse signal CNT_CLK. The count signal held in the counter 11-1 at that time is a digital signal based on a difference signal as a result of a subtraction of the signal GN4 from the signal G(S+N)4 having the largest signal amplitude among the signals G(S+N)1 to G(S+N)4. The digital signal will be called signal DS4.

At a time t19, the signal level of the pulse RMP_EN is changed to L level. Thus, the change of the potential depending on the time of the ramp signal RMP ends. The signal level of the pulse CNT_EN is also changed to L level. During the period from the time t14 to the time t19, a second comparison is performed which compares between a signal based on a photoelectric conversion signal and a ramp signal.

At a time t20, the signal levels of the pulses RMP_RST are changed to H level, which resets the potential of the ramp signal RMP. The signal level of the pulse PRES is changed to H level, which resets the potential of the FD portion in each of the pixels 100.

The digital signal held in the counter 11-1 is output from the counter 11-1 to an outside of the image pickup apparatus through a horizontal scanning circuit, not illustrated.

This operation above allows the counter 11-1 to hold a pixel signal having the highest signal amplitude, that is, the digital signal based on the pixel signal output by the pixel 100-4 among the pixel signals output by the pixels 100-1 to 100-4. The digital signal held in the counter 11-1 at the time t19 will be described. The counter 11-1 down counts the clock pulse signal CNT_CLK in the comparison operation between the signal GN and the ramp signal RMP. On the other hand, in the comparison operation between the G(S+N) signal and the ramp signal RMP, the counter 11-1 up counts the clock pulse signal CNT_CLK starting from the digital signal based on the signal GN generated by the down count. In other words, switching between the AD conversion on the signal GN and the AD conversion on the G(S+N) signal switches between a decrease and increase of the count signal value by the counting of the clock pulse signals CNT_CLK. As a result, the digital signal held in the counter 11-1 at the time t19 is a digital signal based on a signal resulting from a subtraction of a signal GN4 from a signal G(S+N)4. The signal GN4 includes a noise component of the pixel 100-4, an offset component of the inverting amplifier 12-4, a variation of the offset component of each of the inverting amplifiers 12 of the plurality of inverting amplifiers 12 and a component of an operation variation for each comparator of the plurality of comparators 8. Thus, a digital signal DS4 may be acquired which is based on a signal resulting from a subtraction of the components from the signal G(S+N)4.

Figure 4:
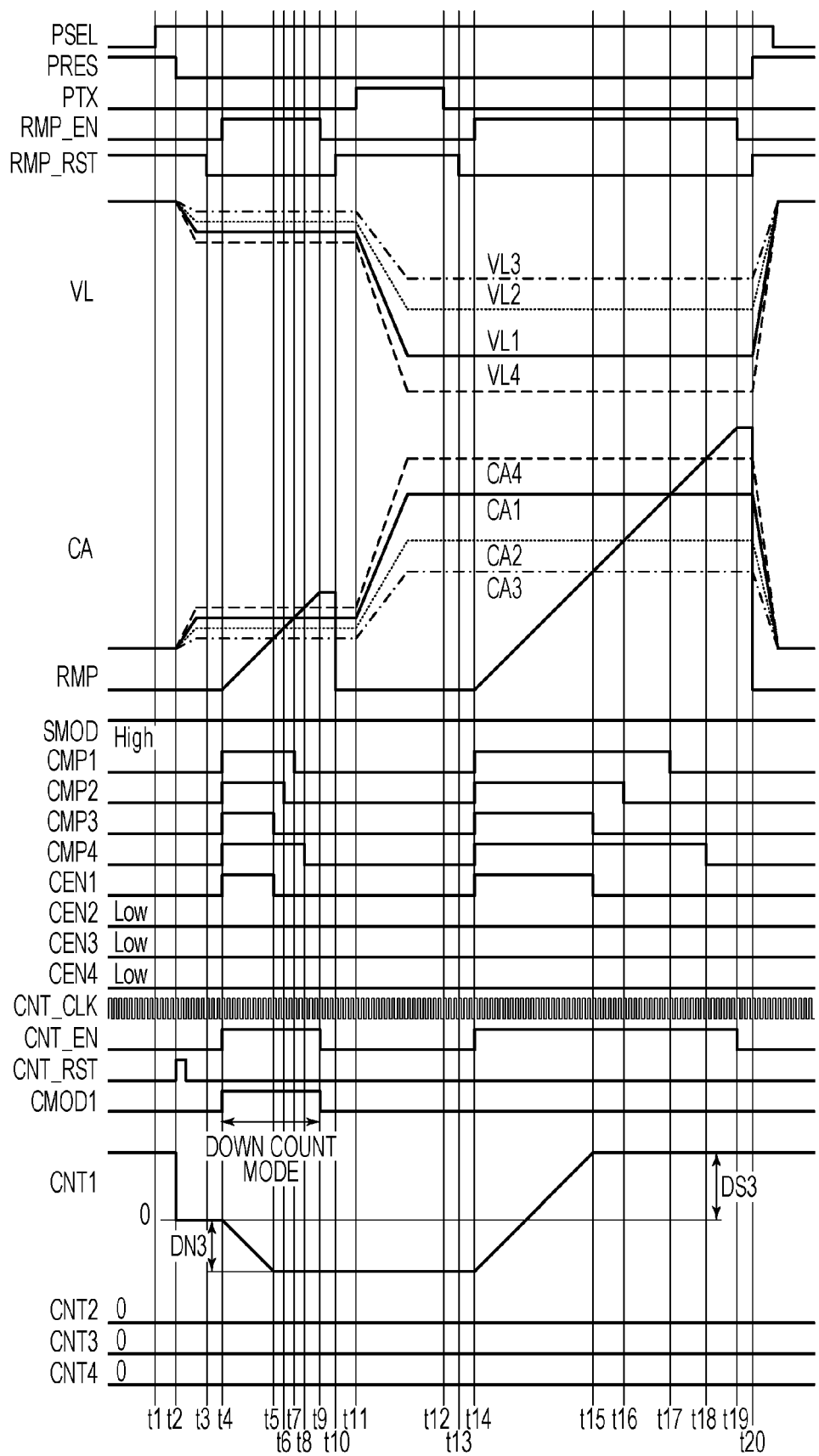
FIG. 4 is a timing chart illustrating another example of an operation of an image pickup apparatus.

The operation has been described in which the counter control unit 10 changes the signal level of the pulse CEN1 from H level to L level on the basis of the comparison result signal CMP having a change at the latest signal value among the comparison result signals CMP1 to CMP4. According to an exemplary operation, the signal level of the pulse CEN1 may be changed from H level to L level on the basis of the comparison result signal CMP that changes the signal value at first among the comparison result signals CMP1 to CMP4. FIG. 4 illustrates a timing chart of the operation. In this operation, the counter control unit 10 may change the signal level of the pulse CEN1 from H level to L level when the signal level of the comparison result signal CMP3 is changed to L level. In other words, the signal level of the pulse CEN1 is changed to L level at the time t5 in the compare between the signal GN and the ramp signal RMP and at the time t15 in the comparison between the signal GS and the ramp signal RMP. This operation allows the counter 11-1 to hold a digital signal DN3 based on the signal GN3 at the time t8 and a digital signal DS3 based on the signal GS3 at the time t18. As a result, the counter 11-1 may hold a digital signal based on a pixel signal having the lowest signal amplitude among pixel signals output by the pixels 100-1 to 100-4.

Figure 5:
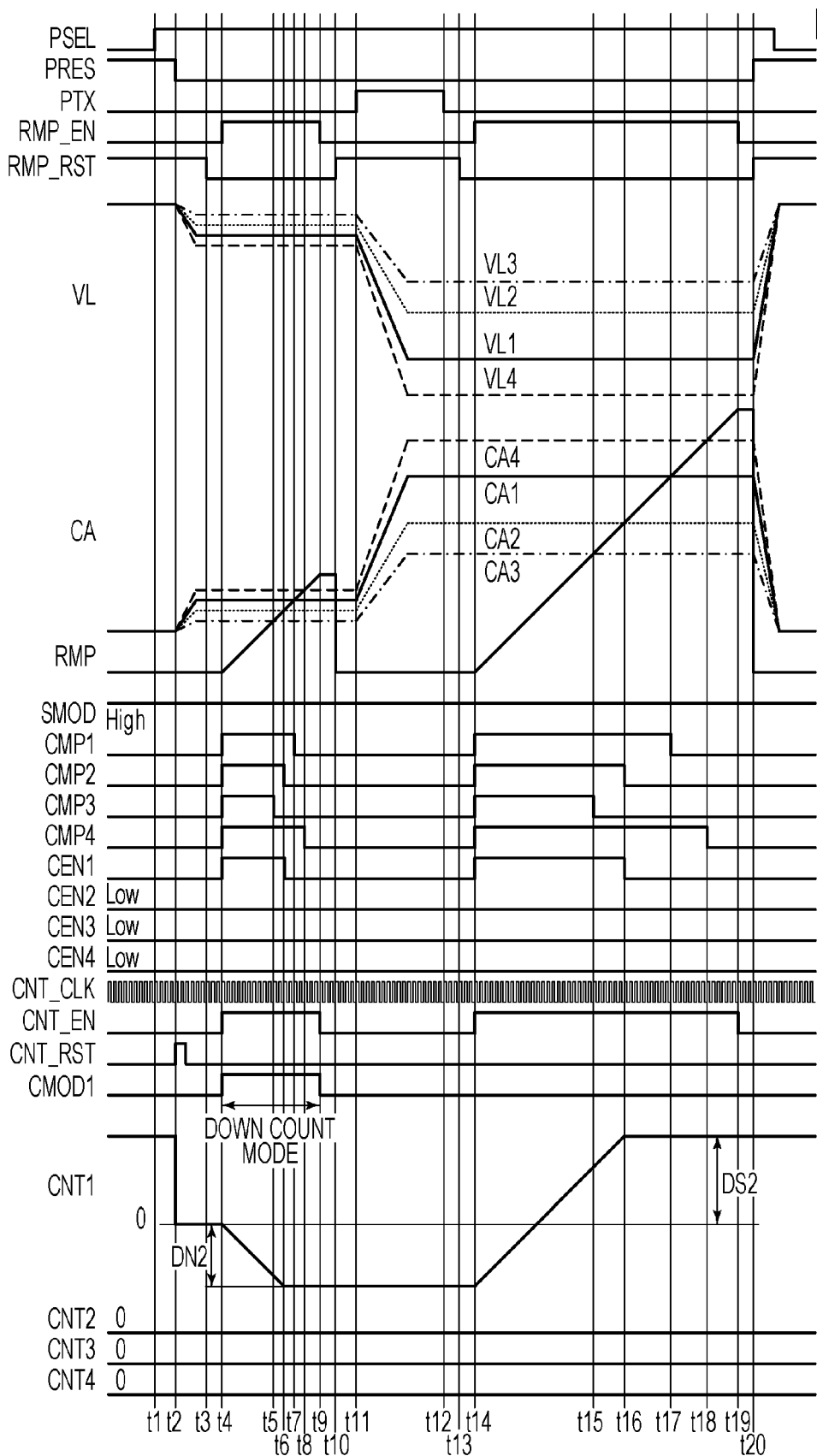
FIG. 5 is a timing chart illustrating another example of an operation of an image pickup apparatus.

In another exemplary operation, the signal level of the pulse CEN1 may be changed to L level on the basis of the comparison result signal CMP that changes the signal value at a preset position among the comparison result signals CMP1 to CMP4. In other words, a digital signal based on an intermediate value of pixel signals output by the plurality of pixels 100. The term intermediate value refers to a value positioned between a highest value and a lowest value. For example, an operation will be described in which the signal level of the pulse CEN1 is changed from H level to an L level on the basis of a comparison result signal CMP that changes the signal value at second among the comparison result signals CMP1 to CMP4. FIG. 5 illustrates a timing chart illustrating the operation. In this operation, when the comparison result signal CMP2 is changed from H level to L level, the signal level of the pulse CEN1 may be changed from H level to L level. In other words, the signal level of the pulse CEN1 may be changed from H level to L level at the time t6 in the comparison between the signal GN and the ramp signal RMP and at the time t16 in the comparison between the signal GS and the ramp signal RMP. This operation allows the counter 11-1 to hold the digital signal DN2 based on the signal GN2 at the time t8 and the digital signal DS2 based on the signal GS2 at the time t18. This operation allows the counter 11-1 to hold a digital signal based on the pixel signal having the second lowest signal amplitude among the pixel signals output by the pixels 100-1 to 100-4.

The position of the comparison result signal CMP on which the change of the signal level of the pulse CEN1 from H level to L level based among the plurality of comparison result signals CMP output by the counter control unit 10 may be set by a timing generator, not illustrated, in the counter control unit 10. The position of the comparison result signal CMP on which the change of the signal level of the pulse CEN1 from H level to L level based may be set in the counter control unit 10 by an external device to the image pickup apparatus when the image pickup apparatus is manufactured. The image pickup apparatus may further include a setting storage unit which stores the setting regarding the position of the comparison result signal CMP on which the change of the signal level of the pulse CEN1 from H level to L level based. In an exemplarily image pickup apparatus having the setting storage unit, the position of the comparison result signal CMP on which the change of the signal level of the pulse CEN1 from H level to L level based may be stored in the setting storage unit by an external device to the image pickup apparatus when the image pickup apparatus is manufactured. The counter control unit 10 then may control the pulse CEN1 on the basis of the information stored in the setting storage unit.

In the image pickup apparatus illustrated in FIGS. 1 to 5, digital signals based on the highest, lowest and intermediate values of the signals output by the plurality of inverting amplifiers 12 may be acquired. This image pickup apparatus provides a signal having a higher or lower signal level than a predetermined signal level output by the inverting amplifiers 12 without an operation of transmitting digital signals from all counter 11, for example. The operation of acquiring a digital signal based on a highest or lowest value of pixel signals output by the plurality of pixels 100 may allow determination on whether the signal level of the digital signal based on pixel signals output by the plurality of pixels 100 is within a predetermined range or not, for example. This may only requires less amount of data to determine whether the signal level of the digital signal based on pixel signals output by the plurality of pixels 100 is within a predetermined range or not than the operation causing all counters 11 to transmit digital signals. It may further reduce the period for transmitting a digital signal held in the counter 11, compared with the operation causing all counters 11 to transmit digital signals. If the range of the signal levels of the digital signals based on the pixel signals output by the plurality of pixels 100 deviates from the predetermined range, the signal levels of the signals based on pixel signal may be adjusted, by, for example, correcting amplification factors of the inverting amplifiers 12.

The image pickup apparatus exemplarily illustrated in FIGS. 1 to 5 has been described in which a digital signal based on one of the highest value, lowest value, and intermediate value of the pixel signals output by the plurality of pixels 100 is acquired. According to another operation, the digital signals based on the highest value and lowest value may be acquired simultaneously. For example, the counter 11-1 may store a digital signal based on the highest value, and the counter 11-2 may store a digital signal based on the lowest value. In this case, the counters 11-1 and 11-2 correspond to the first counter. In the same manned, in the image pickup apparatus exemplarily illustrated in FIGS. 1 to 5, digital signals based on the highest value and an intermediate value may be acquired simultaneously. In this operation, for example, the counter 11-1 may hold a digital signal based on the highest value, and the counter 11-2 may hold a digital signal based on the intermediate value. In the image pickup apparatus of this embodiment, digital signals based on the lowest value and an intermediate value may be acquired simultaneously. In this operation, for example, the counter 11-1 may hold a digital signal based on the lowest value, and the counter 11-2 may hold a digital signal based on the intermediate value. In the image pickup apparatus in FIGS. 1 to 5, the counters 11-2 to 11-4 are disabled. According to another operation of the image pickup apparatus of this embodiment, the counter 11-1 holds a digital signal based on one of the highest value, lowest value, and intermediate value of the signals output by the plurality of pixels 100. The counter 11-2, counter 11-3 and counter 11-4 may hold digital signals based on the pixel 100-2, pixel 100-3, and pixel 100-4, respectively.

Figure 6:
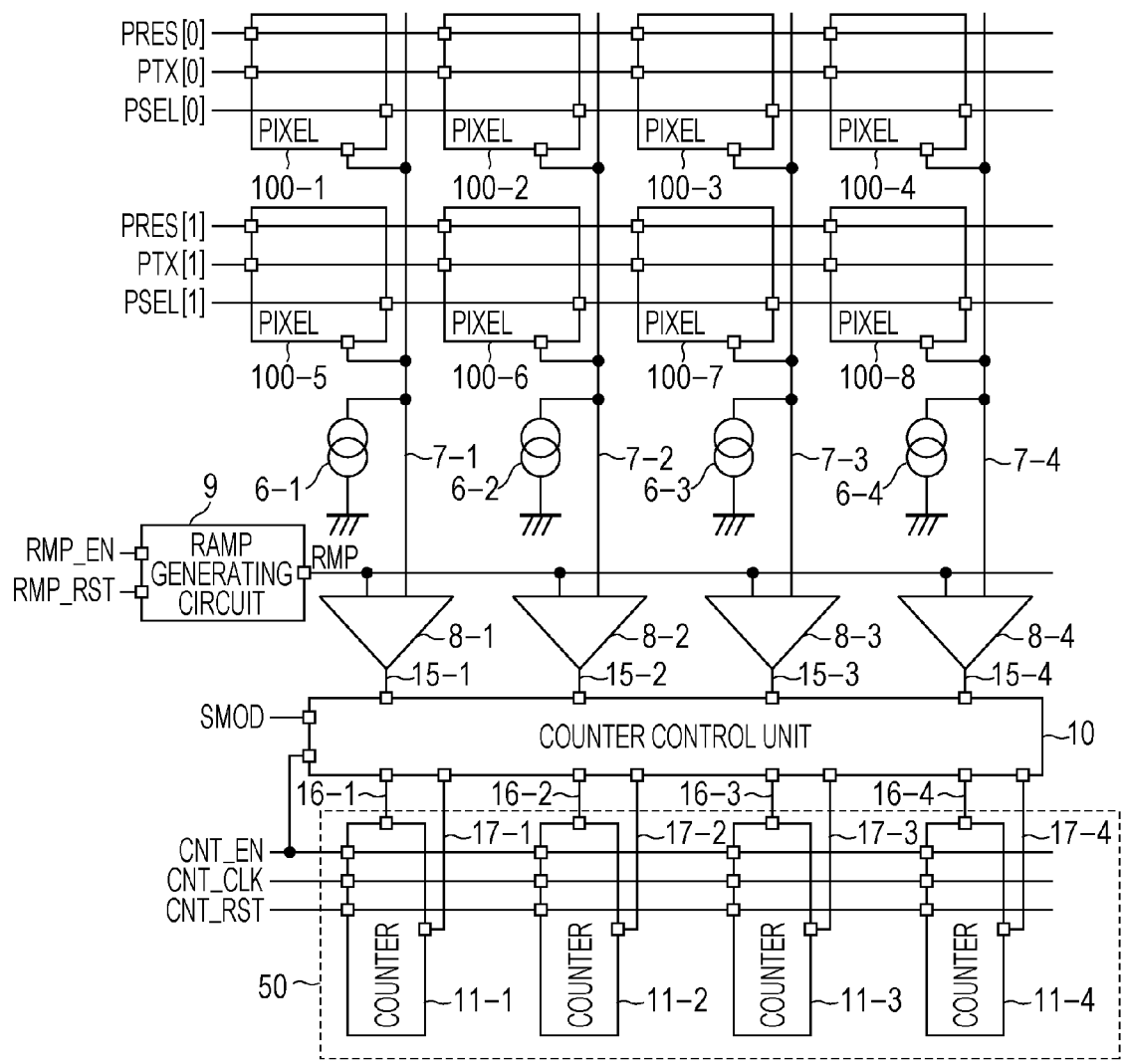
FIG. 6 is a block diagram of another example of an image pickup apparatus.

The image pickup apparatus in FIG. 1 has been described in which pixel signals output by the pixels 100 are inverted and amplified by the inverting amplifiers 12 and are output to the comparators 8. However, the inverting amplifier 12 may not be provided. In other words, the pixel signals output by the pixels 100 may be output to the comparators 8, as illustrated in FIG. 6. In this case, the counter control unit 10 may generate the pulse CEN1 on the basis of the potentials VL1 to VL4 of the first vertical signal lines 7-1 to 7-4. For example, there will be described the operation of acquiring a digital signal based on the highest value of pixel signals output by the plurality of pixels 100 described with reference to FIG. 3. This operation may only require generation of the pulse CEN1 based on the potential VL4 with the highest signal amplitude among the first vertical signal lines 7-1 to 7-4. The same is true in the operations described with reference to FIG. 4 and FIG. 5. In the case that the inverting amplifier 12 is not provided, the gradient of change of the potential of the ramp signal RMP may be the opposite against the gradients illustrated in FIGS. 3 to 5. Also in the image pickup apparatus exemplarily illustrated in FIG. 6, the signals output from the pixels 100 to the comparators 8 may come under the category of "signal based on a pixel signal".

In the image pickup apparatus exemplarily illustrated in FIGS. 1 to 5, each of the signal GN and the G(S+N) signal is converted to a digital signal. The present invention may not require conversion of the signal GN and G(S+N) signal to digital signals. In other words, the G(S+N) signal may be converted to a digital signal, without converting the signal GN to a digital signal. In this case, the counter 11 may perform either up counting or down counting.

Figure 7:
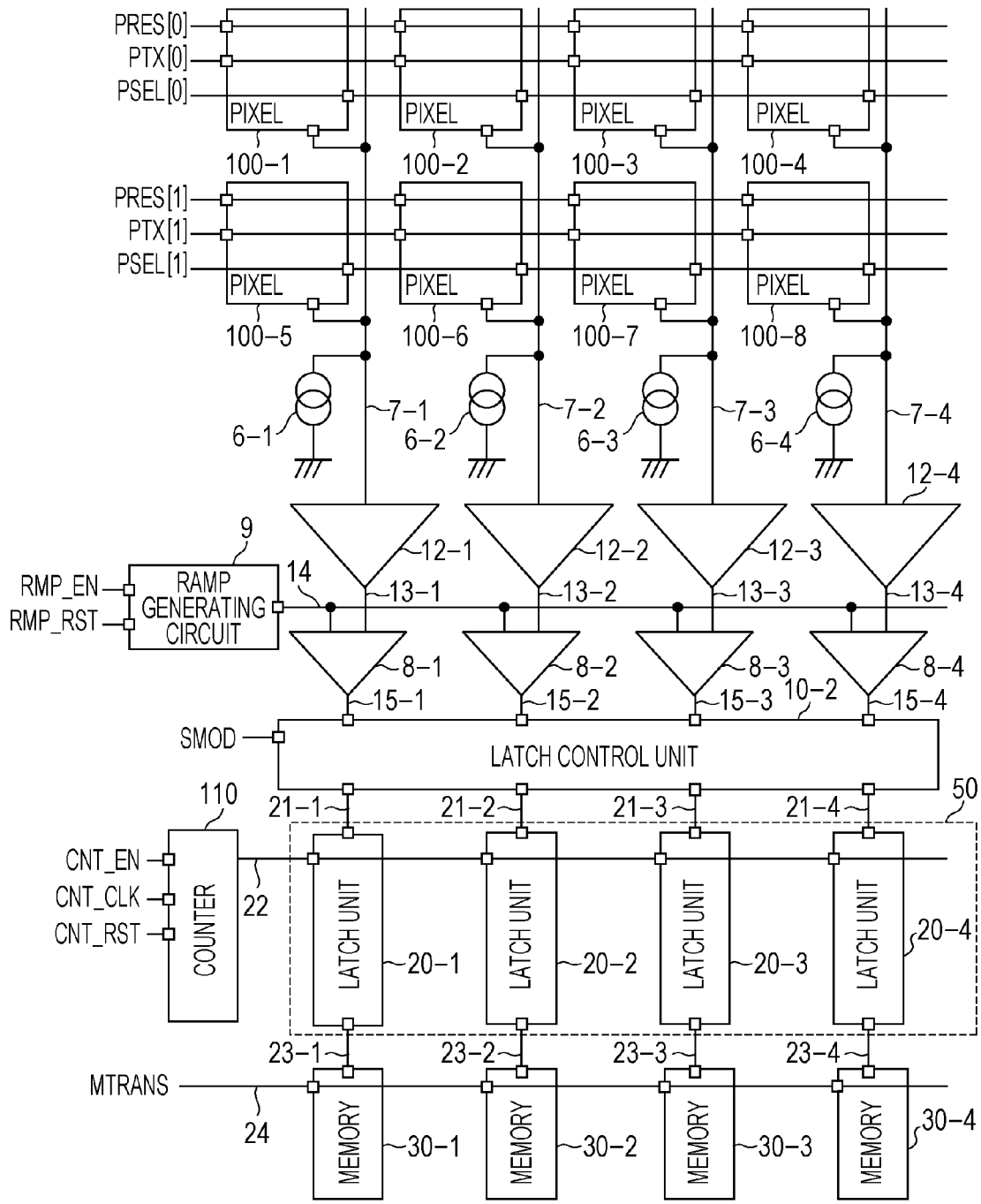
FIG. 7 is a block diagram of another example of an image pickup apparatus.

According to this embodiment, there has been described the counters 11 provided correspondingly to the columns of pixels. FIG. 7 exemplarily illustrates an image pickup apparatus having another embodiment according to this embodiment. The embodiment will be described with reference to FIG. 7.

In FIG. 1 and FIG. 7, like references denote components having like functions in the image pickup apparatuses exemplarily illustrated in the figures. Differences from the image pickup apparatus exemplarily illustrated in FIG. 1 will be mainly described.

The image pickup apparatus in FIG. 7 includes a latch control unit 10-2 instead of the counter control unit 10. The latch control unit 10-2 receives pulses SMOD from a timing generator, not illustrated, like the counter control unit 10. The latch control unit 10-2 is connected to latch units 20-1 to 20-4 through latch signal transmission lines 21-1 to 21-4. The latch units 20-1 to 20-4 are connected to the counter 110 through count signal transmission line 22. The counter 110 receives pulses CNT_EN, clock pulse signals CNT_CLK, and pulses CNT_RST from a timing generator, not illustrated. The counter 110 outputs a count signal based on pulses output from a timing generator, not illustrated, to the count signal transmission line 22. The latch units 20-1 to 20-4 are connected to memories 30-1 to 30-4 through hold signal transmission lines 23-1 to 23-4. The memories 30-1 to 30-4 receive pulses MTRANS from a timing generator, not illustrated through a memory transfer control line 24. The holding unit 50 in the image pickup apparatus in FIG. 7 includes the latch units 20-1 to 20-4. A control unit causing the holding unit 50 to hold a count signal corresponds to the latch control unit 10-2 in the image pickup apparatus in FIG. 7. The latch unit 20-1 functions as a first holding unit. The latch units 20-2, 20-3, and 20-4 function as second holding units.

Next, with reference to FIG. 8, an example of an operation of the image pickup apparatus exemplarily illustrated in FIG. 7 will be described.

Figure 8:
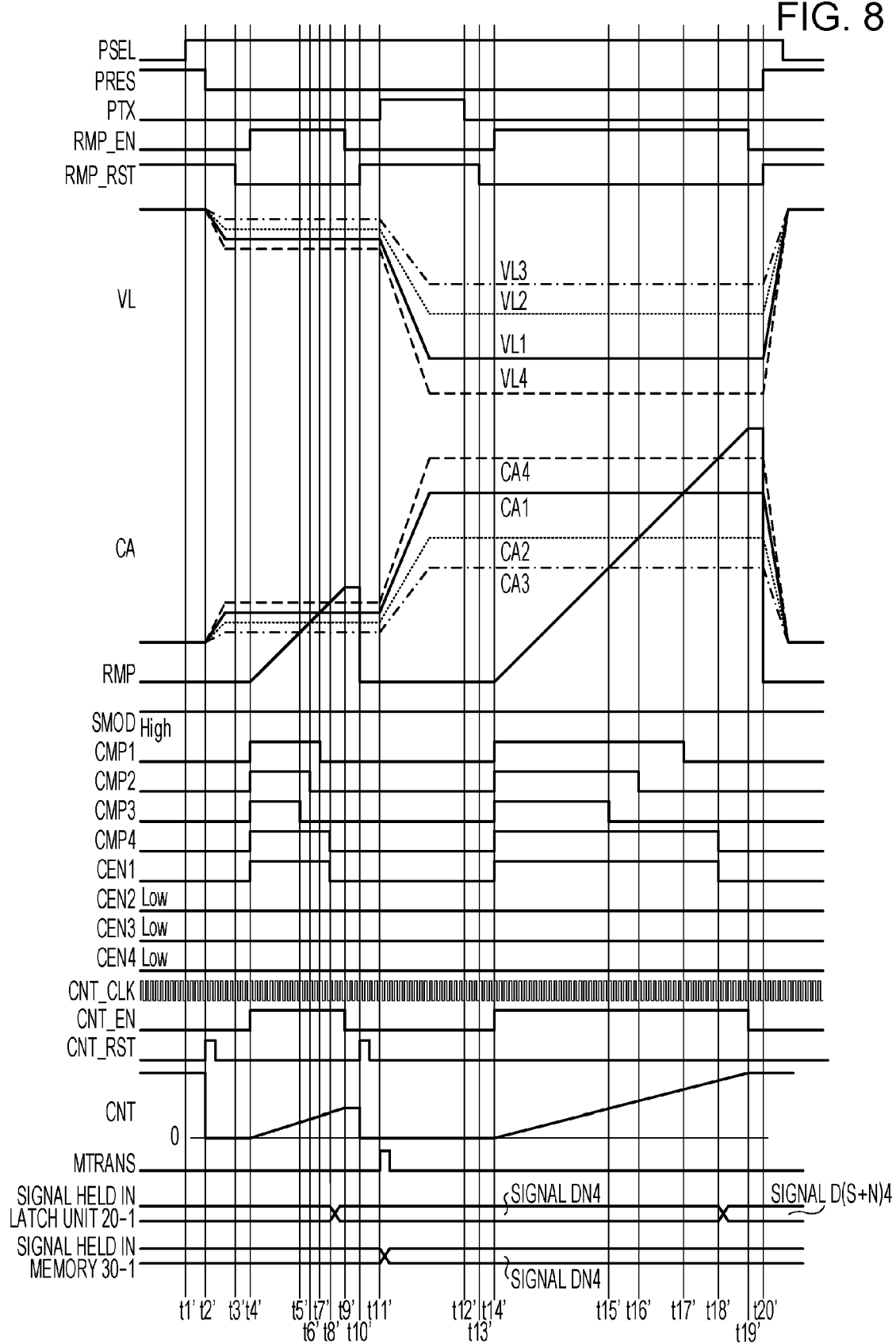
FIG. 8 is a timing chart of another example of an operation of an image pickup apparatus.

The pulses CEN1 to CEN4 in FIG. 8 are transmitted through the latch signal transmission lines 21-1 to 21-4, respectively. Referring to the timing charts in FIG. 3 to FIG. 5, the pulse CMOD1 is output from the counter control unit 10. On the other hand, in the image pickup apparatus exemplarily illustrated in FIG. 7, the pulse CMOD1 may be omitted. The timing charts in FIG. 3 to FIG. 5 illustrate count signal values CNT1 to CNT4 of the counters 11-1 to 11-4, respectively. Because the counter 110 exemplarily illustrated in FIG. 7 has at least one of them, FIG. 7 illustrates a count signal output by the counter 110.

An operation in which the signal level of the pulse CEN1 is changed from H level to L level on the basis of a comparison result signal CMP that changes the signal value at last will be described below. A difference from the operation described with reference to FIG. 3 will be mainly described.

Operations from a time t1' to time t3' may be similar to the operations from the time t1 to the time t3 illustrated in FIG. 3.

At a time t4', the signal level of the pulse CNT_EN is changed to H level. Thus, the counter 110 starts counting the clock pulse signal CNT_CLK. The count signal value increases in accordance with the count of the clock pulse signals CNT_CLK. The other operation at the time t4' may be similar to the operation at the time t4 illustrated in FIG. 3.

The operations from a time t5' to a time t7' may be similar to the operations from the time t5 to the time t7 illustrated in FIG. 3.

At a time t8', the signal value of the comparison result signal CMP4 changes from H level to L level. Thus, the latch control unit 10-2 changes the signal level of the pulse CEN1 from H level to L level. The latch unit 20-1 holds the current count signal. The count signal is a digital signal based on the signal GN4. In other words, it is the signal DN4.

At a time t9', the signal level of the pulse CNT_EN is changed to L level. Thus, the counter 110 finishes counting of the clock pulse signals CNT_CLK.

At a time t10', the signal level of the pulse CNT_RST is changed to H level. This operation may be performed during a period from time t9' before the time t14'. The others operations may be similar to the operations at the time t10 illustrated in FIG. 3.

At a time t11', the pulse MTRANS is changed to H level. Thus, the signal DN4 held in the latch unit 20-1 is held in the memory 30-1. The signal level of the pulse MTRANS from L level to H level may be changed during a period from the time t10' before the time t14'.

The operations at the times t12' and t13' may be similar to the operations at the times t12 and t13 illustrated in FIG. 3.

At a time t14', the signal level of the pulse CNT_EN is changed to H level again. Thus, the counter 110 starts counting the clock pulse signal CNT_CLK. The count signal value increases in accordance with the count of the clock pulse signals CNT_CLK. The other operation at the time t14' may be similar to the operation at the time t14 illustrated in FIG. 3.

The operations from the time t15' to the time t17' may be similar to the operations from the time t15 to the time t17 illustrated in FIG. 3.

At a time t18', the comparison result signal CMP4 changes from H level to L level. Thus, the latch control unit 10-2 changes the signal level of the pulse CEN1 from H level to L level. The latch unit 20-1 holds the current count signal. The count signal is a digital signal based on the signal G(S+N)4. The digital signal will be called a signal D(S+N)4.

At a time t19', the signal level of the pulse CNT_EN is changed to L level. Thus, the counter 110 finishes counting the clock pulse signal CNT_CLK.

The operation at the time t20' may be similar to the operation at the time t20 illustrated in FIG. 3.

A digital signal excluding a noise component may be acquired by subtracting the signal DN4 held in the memory 30-1 from the signal D(S+N)4 held in the latch unit 20-1 at the time t18'. The operation of subtracting the signal DN4 from the signal D(S+N)4 may be performed by a digital signal processing unit internally provided in the image pickup apparatus or may be performed by a digital signal processing unit externally provided to the image pickup apparatus.

In the operation in FIG. 8, the signal value of the pulse CEN1 changes on the basis of the comparison result signal CMP4 that changes the signal value at last among the comparison result signals CMP1 to CMP4. According to another operation in the image pickup apparatus exemplarily illustrated in FIG. 10, the signal value of the pulse CEN1 may change on the basis of the comparison result signal CMP that changes the signal value at first among a plurality of comparison result signals CMP. Alternatively, the signal value of the pulse CEN1 may change on the basis of a comparison result signal CMP having its signal value at a preset position among a plurality of comparison result signals CMP.

In this way, in the image pickup apparatus exemplarily illustrated in FIG. 7, the holding unit may perform an operation of holding a count signal based on a comparison result signal CMP that changes the signal value at a predetermined position. This provides the same effect as that of the image pickup apparatus exemplarily illustrated in FIG. 1.

The aforementioned image pickup apparatus of this embodiment has 4 columns of comparators 8-1 to 8-4, 4 columns of counters 11-1 to 11-4 or 4 columns of latch units 20-1 to 20-4, for example. However, the image pickup apparatus of this embodiment is not limited to the embodiment. In other words, the image pickup apparatus may only require a holding unit which holds a digital signal on the basis of a comparison result signal having a potential that changes at a predetermined position among comparison result signals of a plurality of columns.

The exemplary ramp signal RMP has a potential that changes gently depending on the time. However, the present invention is not limited thereto, but it may be a signal having a potential that changes in stepwise manner depending on the time. In other words, a signal having a potential that changes in stepwise manner depending on the time includes a signal having a potential that changes gently and a signal having a potential that changes in stepwise manner.

In an image pickup apparatus in the past, all of the counters 11-1 to 11-4 are required to output count signals held therein in order to determine which counter 11 outputs the count signal based on the comparison result signal that the signal value changes at Nth. In other words, without transferring count signals from all of the counters 11-1 to 11-4, which counters 11 hold the highest value, lowest value, and intermediate value may not be grasped. On the other hand, in an image pickup apparatus of this embodiment, because the counter 11-1 holds the highest value, lowest value, or intermediate value, causing the counter 11-1 to output its holding count signal may provide the highest value, lowest value, or intermediate value.

When the counters 11-2 to 11-4 are disabled in the image pickup apparatus in FIGS. 1 to 5, the following effects may be provided. Operating the counter 11-1 only, instead of operating all of the counters 11, a digital signal based on one of the highest value, lowest value, and intermediate value of the signals output by the plurality of pixels 100 may be acquired. Thus, the power consumption may be reduced more than the case where all of the counters 11 operate. causing the counter 11-1 to output its holding digital signal, instead of causing all of the counters 11 to output digital signals, a digital signal based on one of the highest value, lowest value, and intermediate value of the signals output by the plurality of pixels 100 may be acquired. Therefore, the time for outputting digital signals from the counter 11 may be reduced more than the case where all of the counters 11 are caused to output their digital signals. In addition, the amount of data of a digital signal output to an external device to the image pickup apparatus may be reduced.

Second Embodiment

An image pickup apparatus according to a second embodiment will be described with reference to drawings by focusing on differences from the first embodiment.

Figure 9:
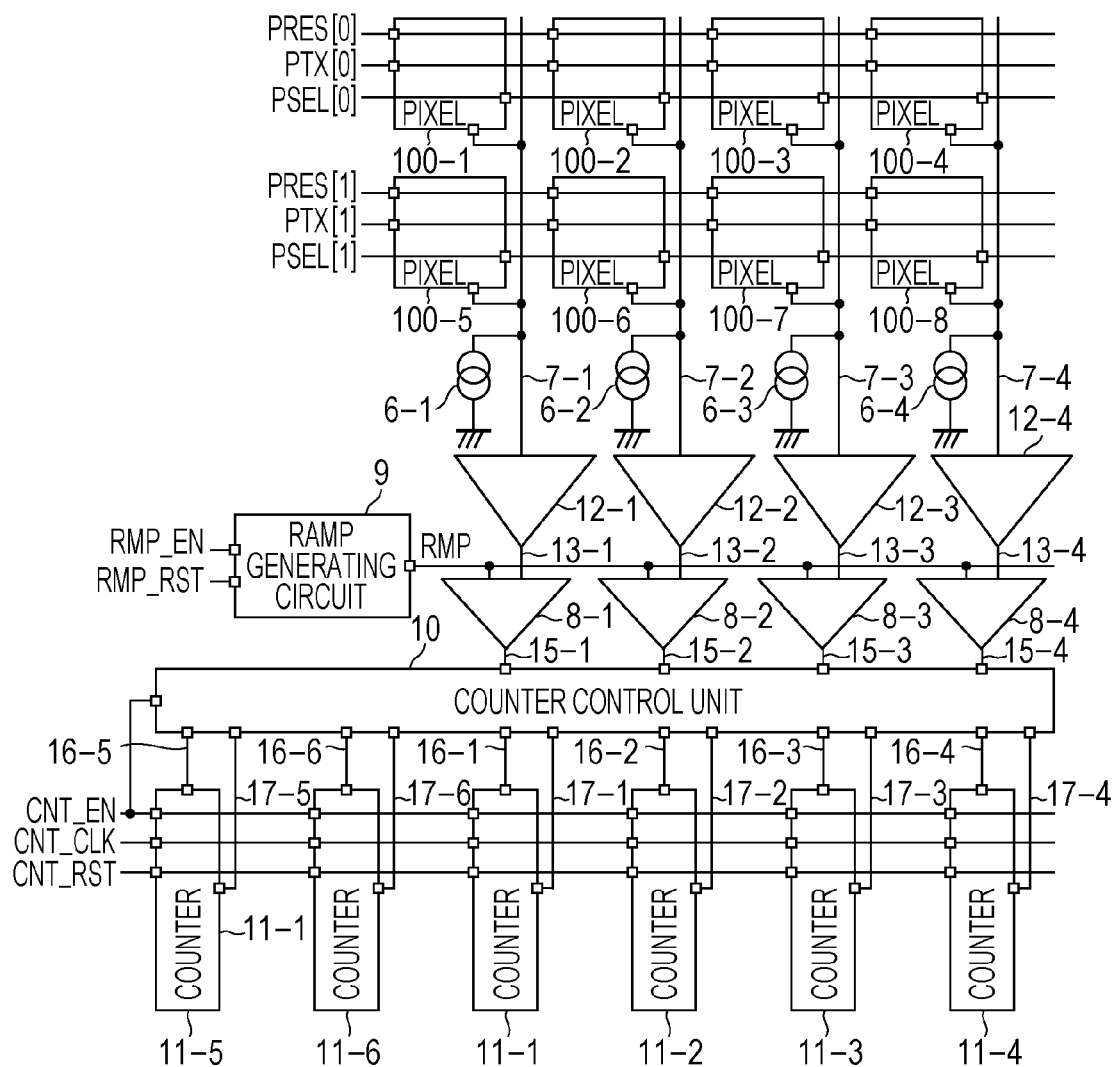
FIG. 9 is a block diagram of another example of an image pickup apparatus.

FIG. 9 is a block diagram illustrating an example of an image pickup apparatus of this embodiment. In FIG. 1 and FIG. 9, like references denote components having like functions. The image pickup apparatus exemplarily illustrated in FIG. 9 has counters 11-1 to 11-4 provided correspondingly to the columns of pixels 100-1 to 100-4 and further has counters 11-5 and 11-6 separately from the counters 11-1 to 11-4. A counter control unit 10 and the counters 11-1 to 11-6 are connected through first pulse transmission lines 16-1 to 16-6 and second pulse transmission lines 17-1 to 17-6. The first pulse transmission lines 16 transmit pulses CEN from the counter control unit 10 to the counters 11. The second pulse transmission lines 17 transmit pulses CMOD from counter control unit 10 to the counters 11. The counter 11-5 holds a digital signal based on the lowest value of the pixel signals output by the plurality of pixels 100. The counter 11-6 holds a digital signal based on the highest value of the pixel signals output by the plurality of pixels 100. In the image pickup apparatus of this embodiment, the counters 11-5 and 11-6 are arranged on different columns from those with a plurality of comparators 8. The counters 11-5 and 11-6 correspond to first holding units in the image pickup apparatus exemplarily illustrated in FIG. 9. The counters 11-5 and 11-6 correspond to first counters which hold count signals on the basis of comparison result signals that the signal values change at Nth. The counters 11-1 to 11-4 correspond to second holding units exemplarily illustrated in FIG. 9. The counters 11-1 to 11-4 correspond to second counters which may be disabled during a period while the first counters are performing a clock pulse signal counting operation. A holding unit 50 of this embodiment includes the counters 11-1 to 11-6.

Figure 10:
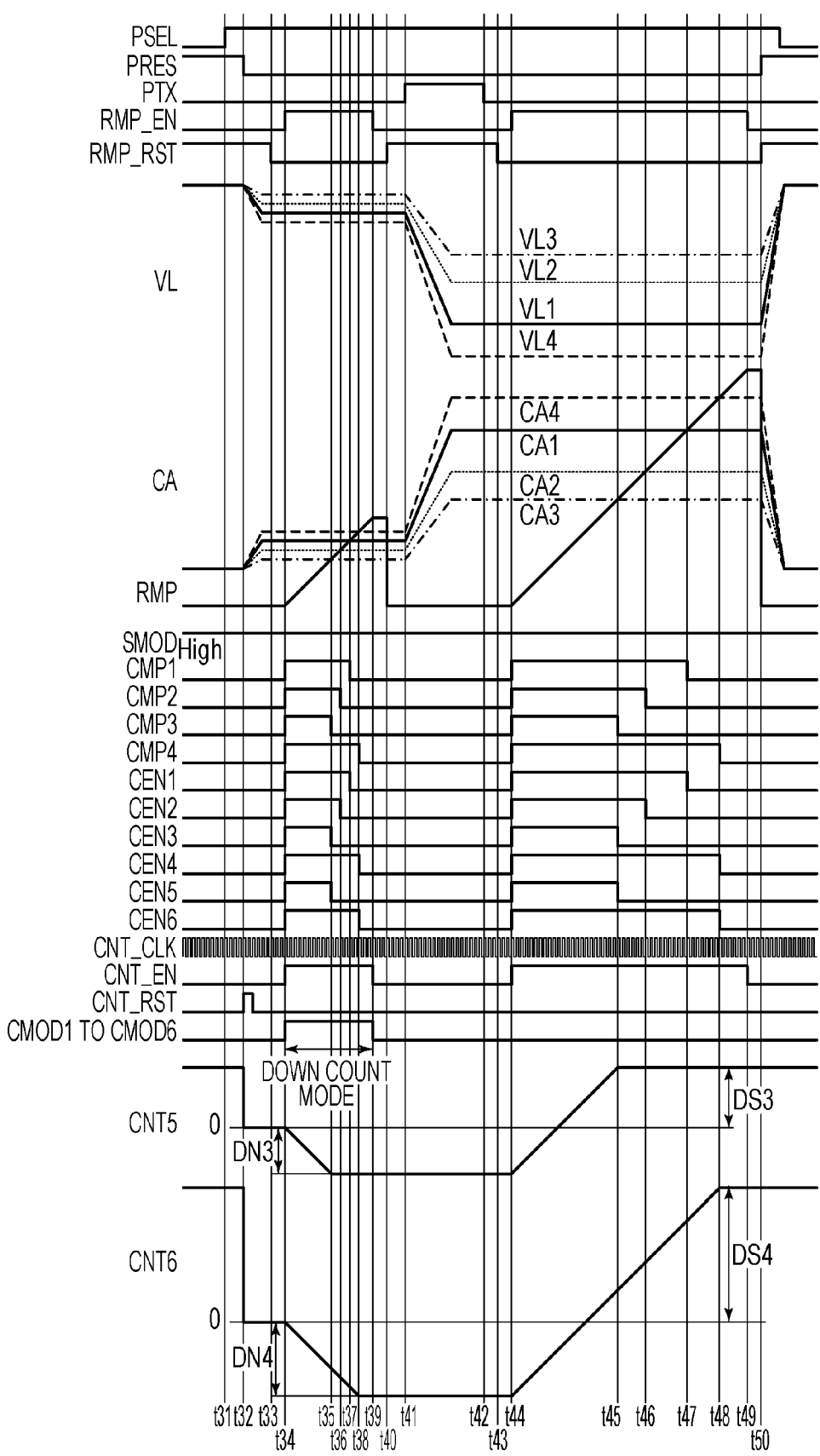
FIG. 10 is a timing chart of another example of an operation of an image pickup apparatus.

FIG. 10 is a timing chart illustrating an example of an operation of the image pickup apparatus exemplarily illustrated in FIG. 9. The following operations assume a relationship of VL3<VL2<VL1<VL4 between signal amplitudes of the vertical signal lines 7-1 to 7-4, like the first embodiment. The term signal amplitude here refers to the amount of change from the potential of the vertical signal line 7 that is output when the potential of the FD portion is reset. The signal amplitudes of the inverting amplification signal line 13-1 to 13-4 has a relationship of CA3<CA2<CA1<CA4, like the first embodiment. Because the pulses CMOD1 to CMOD6 have an equal signal value at all times, they are illustrated as pulses CMOD1 to CMOD6 in the operation illustrated in FIG. 10.

At a time t31, the pulses CEN1 to CEN6 and pulses CMOD1 to CMOD6 are all at L level. The other operations at the time t31 may be similar to the operation at the time t1 described with reference to FIG. 3.

The operation at a time t32 may be similar to the operation at the time t2 described with reference to FIG. 3. The signal level of the pulse CNT_RST is changed to H level, and the countersignals of the counters 11-1 to 11-6 are thus reset.

The operation at a time t33 may be similar to the operation at the time t3 described with reference to FIG. 3.

At a time t34, the signal level of the pulse RMP_EN is changed to H level. Thus, a change of the potential of the ramp signal RMP depending on the time starts. The signal level of the pulse CNT_EN is changed to H level. The counter control unit 10 changes the signal levels of the pulses CEN1 to CEN6 to H level. The counters 11 count clock pulse signals CNT_CLK when both of the signal levels of the pulse CEN and the pulse CNT_EN output from the counter control unit 10 are at H level. In other words, when the signal level of the pulse CNT_EN is at H level, the counter 11-5 counts the pulse CEN5, for example. When the signal level of the pulse CEN6 is at H level, the counter 11-6 counts the clock pulse signal CNT_CLK, for example. The counter control unit 10 changes the signal levels of the pulses CMOD1 to CMOD6 to H level. Thus, the counters 11-1 to 11-6 down count the clock pulse signals CNT_CLK. The comparison result signals CMP1 to CMP4 are at H level.

At a time t35, the magnitude relationship between the potential CA3 of the inverting amplification signal line 13-3 and the potential of the ramp signal RMP is inverted, and the comparison result signal CMP3 is changed to L level. The counter control unit 10 changes the pulses CEN3 and CEN5 to L level. Thus, the counters 11-3 and 11-5 hold the current count signals. The count signals held by the counters 11-3 and 11-5 are a digital signal DN3 based on the signal GN3 having the lowest signal amplitude among the signals GN1 to GN4. The other comparison result signals CMP1, CMP2, and CMP4 are continuously at H level.

At a time t36, the magnitude relationship between the potential CA2 of the inverting amplification signal line 13-2 and the potential of the ramp signal RMP is inverted, and the comparison result signal CMP2 is changed to L level. The counter control unit 10 changes the signal level of the pulse CEN2 to L level. The counter 11-2 holds the current count signal. The count signal held by the counter 11-2 is a digital signal DN2 based on the signal GN2 having the second lowest signal amplitude among the signals GN1 to GN4. The comparison result signals CMP1 and CMP4 are continuously at H level.

At a time t37, the magnitude relationship between the potential CA1 of the inverting amplification signal line 13-1 and the potential of the ramp signal RMP is inverted, and the comparison result signal CMP1 is changed to L level. The counter control unit 10 changes the signal level of the pulse CEN1 to L level. The counter 11-1 holds the current count signal. The count signal held by the counter 11-1 is a digital signal DN1 based on the signal GN1 having the third lowest signal amplitude among the signals GN1 to GN4. The comparison result signal CMP4 is continuously at H level.

At a time t38, the magnitude relationship between the potential CA4 of the inverting amplification signal line 13-4 and the potential of the ramp signal RMP is inverted, and the comparison result signal CMP4 is changed to L level. The counter control unit 10 changes the pulses CEN4 and CEN6 to L level. The counters 11-4 and 11-6 hold the current count signals. The count signals held by the counters 11-4 and 11-6 are a digital signal DN4 based on the signal GN4 having the highest signal amplitude among the signals GN1 to GN4.

At a time t39, the signal level of the pulse RMP_EN is changed to L level. Thus, the change of the potential depending on the time of the ramp signal RMP ends. The signal levels of the pulses CNT_EN and CMOD1 to 6 are all changed to L level. The counters 11-1 to 11-4 hold digital signals based on the signals GN1 to GN4 resulting from inversion and amplification on the signals AN1 to AN4 output by the pixels 100 of the corresponding columns. The counter 11-5 holds a digital signal based on the signal GN3 resulting from inversion and amplification of a signal AN3 having the lowest signal amplitude among the plurality of pixels 100. The counter 11-6 holds a digital signal based on the signal GN4 resulting from inversion and amplification of a signal AN4 having the highest signal amplitude among the plurality of pixels 100.

The operations from a time t40 to a time t43 may be similar to the operations from the time t10 to the time t13 described with reference to FIG. 3.

At a time t44, the signal level of the pulse RMP_EN is changed to H level, and the change of the potential depending on the time of the ramp signal RMP starts. The counters 11-1 to 11-6 hold countersignals when the signal level of the pulse CNT_EN is changed to L level at time t39. The signal level of the pulse CNT_EN is changed to H level. The signal levels of the pulses CEN1 to CEN6 are changed to H level. Because the signal levels of the pulses CMOD1 to CMOD6 are at L level, the counters 11-1 to 11-6 up-counts the clock pulse signal CNT_CLK from the count signal held at the time t39. The comparison result signals CMP1 to CMP4 are at H level.

At a time t45, the magnitude relationship between the potential CA3 of the inverting amplification signal line 13-3 and the potential of the ramp signal RMP is inverted, and the signal level of the comparison result signal CMP3 is changed to L level. The counter control unit 10 changes the signal levels of the pulses CEN3 and CEN5 to L level. Thus, the counters 11-3 and 11-5 hold the current count signals. The count signals held by the counters 11-3 and 11-5 are a digital signal DS3 based on a signal resulting from a subtraction of the signal GN3 from the signal G(S+N)3. The other comparison result signals CMP1, CMP2, and CMP4 are continuously at H level.

At a time t46, the magnitude relationship between the potential CA2 of the inverting amplification signal line 13-2 and the potential of the ramp signal RMP is inverted, and the comparison result signal CMP2 is changed to L level. The counter control unit 10 changes the signal level of the pulse CEN2 to L level. The counter 11-2 holds the current count signal. The count signal held by the counter 11-2 is a digital signal DS2 based on a signal resulting from a subtraction of the signal GN2 from the signal G(S+N)2. The comparison result signals CMP1 and CMP4 are continuously at H level.

At a time t47, the magnitude relationship between the potential CA1 of the inverting amplification signal line 13-1 and the potential of the ramp signal RMP is inverted, and the signal level of the comparison result signal CMP1 is changed to L level. The counter control unit 10 shifts the signal level of the pulse CEN1 to L level. The counter 11-1 holds the current count signal. The count signal held by the counter 11-1 is a digital signal DS1 based on a signal resulting from the signal GN1 from the signal G(S+N)1. The comparison result signal CMP4 is continuously at H level.

At a time t48, the magnitude relationship between the potential CA4 of the inverting amplification signal line 13-4 and the potential of the ramp signal RMP is inverted, and the signal level of the comparison result signal CMP4 is changed to L level. The counter control unit 10 changes the signal levels of the pulses CEN4 and CEN6 to L level. The counters 11-4 and 11-6 hold the current count signals. The count signal held by the counters 11-4 and 11-6 are a digital signal DS4 based on a signal resulting from a subtraction of the signal GN4 from the signal G(S+N)4.

At a time t49, the signal level of the pulse RMP_EN is changed to L level. Thus, the change of the potential depending on the time of the ramp signal RMP ends. The signal level of the pulse CNT_EN is changed to L level.

At a time t50, the signal level of the pulse RMP_RST is changed to H level, which resets the potential of the ramp signal RMP. The signal level of the pulse PRES is changed to H level, which resets the potential of the FD portion in each of the pixels 100.

The digital signals held by the counters 11-1 to 11-6 are output sequentially from the counters 11-1 to 11-6 to an outside of the image pickup apparatus through a horizontal scanning circuit, not illustrated.

This operation allows the counter 11-5 to hold a digital signal based on a pixel signal having the lowest signal amplitude among the pixel signals output by the pixels 100-1 to 100-4. This operation also allows the counter 11-6 to hold a digital signal based on a pixel signal having the highest signal amplitude among the pixel signals output by the pixels 100-1 to 100-4.

In the image pickup apparatus exemplarily illustrated in FIG. 9, the counters 11 provided correspondingly to columns of the pixels 100 hold digital signals based on the pixel signals output by the corresponding pixels 100. Counter provided separately from the counters 11 provided correspondingly to columns of the pixels 100 hold a digital signal based on the highest value and lowest value of the pixel signals output by a plurality of pixels 100. Thus, the digital signals based on the pixel signals output by a plurality of pixels 100 and the digital signals based on the highest value and lowest value of the pixel signals output by a plurality of pixels 100 may be acquired simultaneously. As a result, for example, a the operation of determining whether the highest value and lowest value of digital signals based on pixel signals output by a plurality of pixels 100 are within a predetermined range or not may be performed in parallel with an operation of converting pixel signals output by the plurality of pixels 100 to digital signals.

In the image pickup apparatus exemplarily illustrated in FIG. 9, the horizontal scanning circuit may transmit digital signals held by the counters 11-5 and 11-6 before transmitting digital signals held by the counters 11-1 to 11-4. In this operation, whether the levels of the pixel signals output by the plurality of pixels 100 are within a predetermined range or not is first determine. For example, if the highest value of the pixel signals output by the plurality of pixels 100 is lower than a predetermined range, the exposure time of the photodiodes is increased. If the highest value is higher than the predetermined range, the exposure time of the photodiodes is reduced. If the lowest value of the pixel signals output by the plurality of pixels 100 is lower than a predetermined range, the exposure time of the photodiodes is increased. If the lowest value is higher than the predetermined range, the exposure time of the photodiodes is reduced. If either highest value or lowest value is or both of them are included in the predetermined range, the horizontal scanning circuit further transmits the digital signals held by the counters 11-1 to 11-4.

The image pickup apparatus exemplarily illustrated in FIG. 9 is compared with an image pickup apparatus (hereinafter called a second image pickup apparatus) excluding the counters 11-5 and 11-6 in which digital signals based on pixel signals output by the pixels 100 are held in the counters 11-1 to 11-4. In the second image pickup apparatus, each of the counters 11-1 to 11-4 outputs its holding digital signal every time it holds a digital signal based on a pixel signal. On the other hand, in the image pickup apparatus exemplarily illustrated in FIG. 9, the counters 11-5 and 11-6 first output their holding digital signals. Then, if both or one of the signal values of the digital signals held by the counters 11-5 and 11-6 are or is included in a predetermined range, the horizontal scanning circuit transmits the digital signals held by the counters 11-1 to 11-4. Conversely, if both or one of the signal values of the digital signals held by the counters 11-5 and 11-6 are or is not included in the predetermined range, the horizontal scanning circuit does not transmit the digital signals held by the counters 11-1 to 11-4. Thus, the period for outputting digital signals from the counters 11-1 to 11-4 may be reduced. The effectiveness increases as the number of comparators 8 by which the counter control unit 10 may grasp a change in a signal value of a comparison result signal increases. If the second image pickup apparatus has several thousand columns of pixels, the counters 11 of the several thousand columns are possibly caused to output digital signals. On the other hand, in the image pickup apparatus exemplarily illustrated in FIG. 9, the horizontal scanning circuit first transmits digital signals held by the counters 11-5 and 11-6. Then, if both or one of digital signals held by the counters 11-5 and 11-6 are or is included in a predetermined range, the horizontal scanning circuit transmits digital signals held by the counters 11 of the several thousand columns. Thus, the period for transmitting digital signals held by the counters 11 of the several thousand columns excluding the counters 11-5 and 11-6 may be reduced. Moreover, the amount of data to be output from the image pickup apparatus may be reduced.

This embodiment is applicable to not only the image pickup apparatus exemplarily illustrated in FIG. 9 but also image pickup apparatuses of other embodiments.

Other applications of the image pickup apparatus in FIG. 9 will be described. It is assumed here that the pixels 100-1 to 100-4 are optical black pixels (hereinafter called OB pixels) in which the photodiodes 1 are shaded. The counters 11-5 and 11-6 hold digital signals based on the highest value and lowest value of signals output by the OB pixels 100-1 to 100-4. On the basis of one or both of the highest value and lowest value of signals output by the OB pixels 100-1 to 100-4, a normal range for the pixels 100 having the photodiode 1 unshaded is set. The pixel 100 having the photodiode 1 unshaded will be called a valid pixel. For example, on the basis of the lowest value of signals output by the OB pixels 100-1 to 100-4, a normal range for signals output by the valid pixels 100 may be set. In this case, if the signals output by the valid pixels 100 exhibits a value that is lower than the lowest value of the signals output by the OB pixels 100-1 to 100-4, an error is determined. Thus, a normal range for signals output by valid pixels may be set in accordance with the highest value and lowest value of signals output by OB pixels in the image pickup apparatus in FIG. 9. This operation may be implemented not only in the image pickup apparatus exemplarily illustrate in FIG. 9 but also in image pickup apparatuses in other embodiments. This operation may also reduce the period for transmitting digital signals held in the counters 11 excluding the counters 11-5 and 11-6. It may further reduce the amount of data to be output from the image pickup apparatus.

The image pickup apparatus of this embodiment may be configured as follows: In an image pickup apparatus having a plurality of columns of pixels 100, comparators 8, and counters 11, the pixels 100, comparators 8, and counters 11 of the plurality of columns are further divided into a plurality of blocks. The counters 11-5 and 11-6 may be provided in each of the blocks to implement the embodiment.

In the image pickup apparatus this embodiment, the counters 11-5 and 11-6 are provided which hold digital signals based on the highest value and lowest value of pixel signals output by the plurality of pixels 100. The image pickup apparatus of this embodiment is not limited to the embodiment but may include one of the counters 11-5 and 11-6. A counter 11 may further be provided which holds a digital signal based on an intermediate value of pixel signals output by the plurality of pixels 100.

In the image pickup apparatus exemplarily illustrated in FIG. 9, the counters 11-5 and 11-6 that are the first counters are disposed separately from the column of the plurality of comparator 8. However, the image pickup apparatus of this embodiment is not limited to the embodiment. In other words, second counters may be provided correspondingly to the comparators 8, and a first counter may further be provided which holds a count signal based on a comparison result signal that the signal value changes at Nth. In other words, the first counter may be provided on the column having the second counters, and the arrangement of the first counter is not limited.

Figure 11:
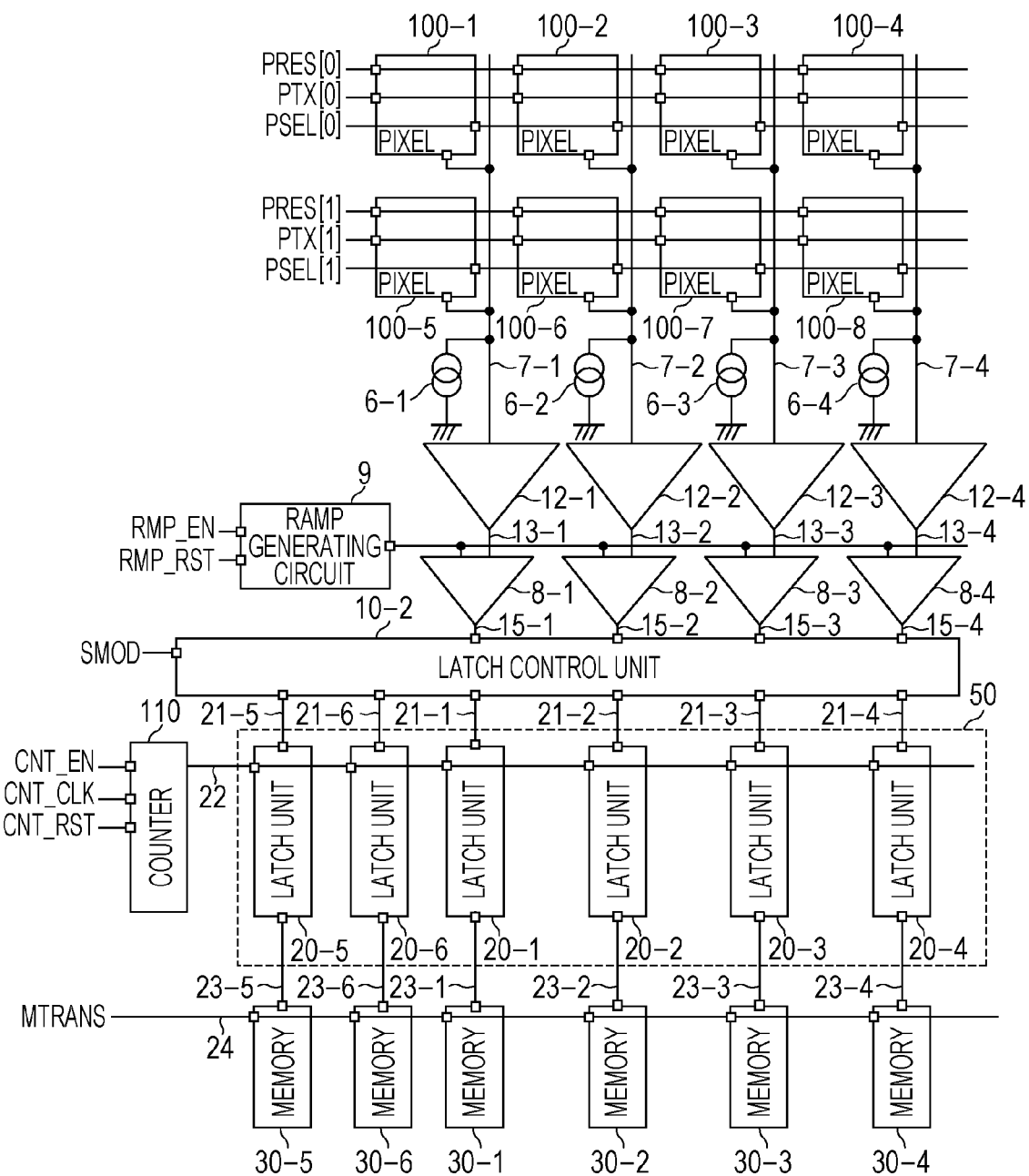
FIG. 11 is a block diagram of another example of an image pickup apparatus.

FIG. 11 illustrates another embodiment of the image pickup apparatus of this embodiment. In the image pickup apparatus exemplarily illustrated in FIG. 11, the counter 110 supplies a common count signal to a plurality of latch units 20. Differences from the image pickup apparatus exemplarily illustrated in FIG. 7 according to the first embodiment will be mainly described below.

The image pickup apparatus in FIG. 11 further includes latch units 20-5 and 20-6 in addition to latch units 20-1 to 20-4 provided correspondingly to the comparators 8-1 to 8-4 of each column. The latch units 20-5 and 20-6 are connected through a latch control unit 10-2 and latch signal transmission lines 21-5 and 21-6. A memory 30-5 is further provided therein which is connected to the latch unit 20-5 through a hold signal transmission line 23-5. A memory 30-6 is further provided therein which is connected to the latch unit 20-6 through a hold signal transmission line 23-6. The latch units 20-5 and 20-6 correspond to first holding units. The latch units 20-1 to 20-4 correspond to second holding units. The latch units 20-5 and 20-6 are disposed separately from the columns of the plurality of comparator 8.

Figure 12:
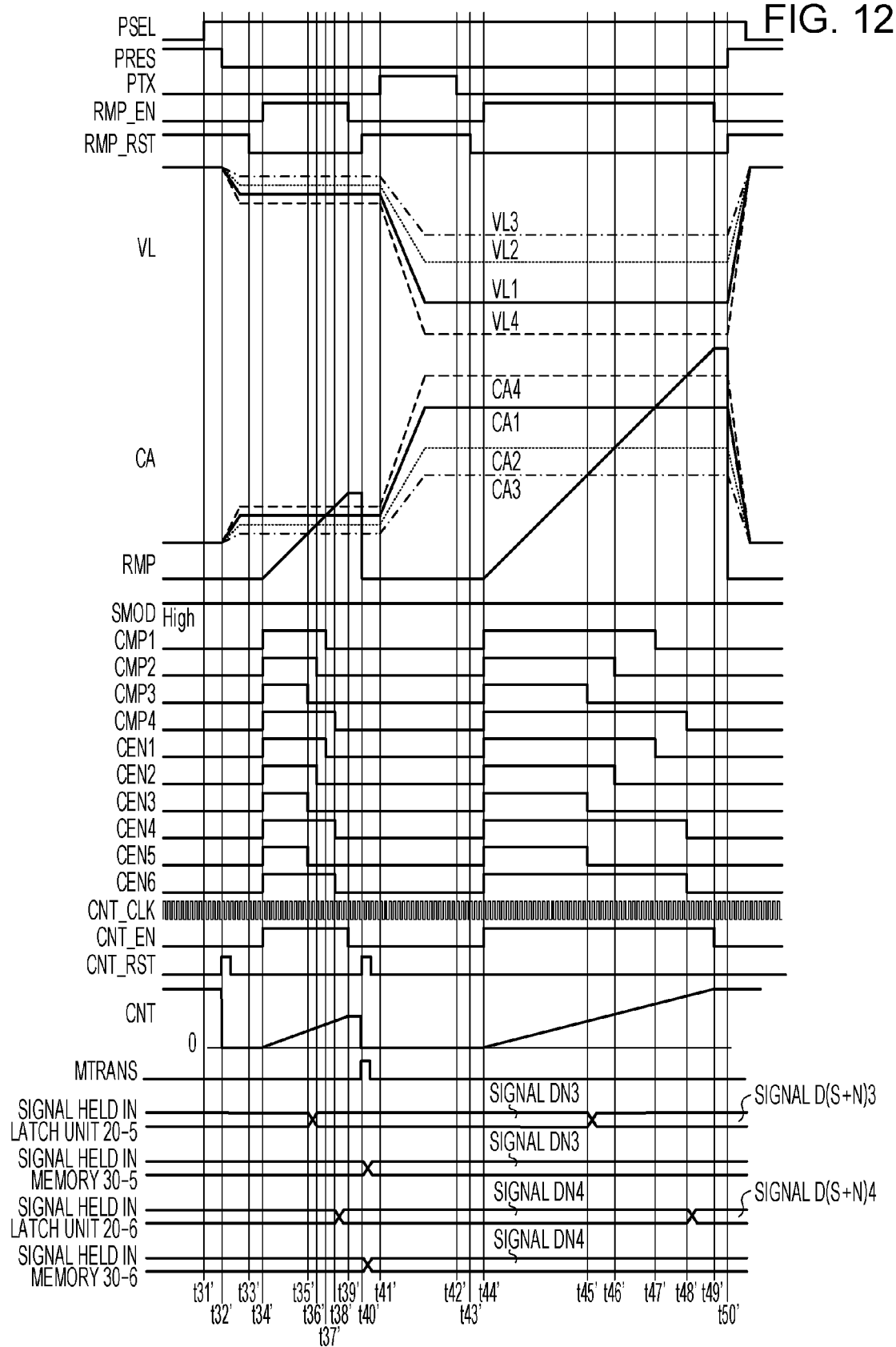
FIG. 12 is a timing chart of another example of an operation of an image pickup apparatus.

FIG. 12 illustrates an example of an operation of the image pickup apparatus exemplarily illustrated in FIG. 11. A difference from FIG. 10 will be mainly described below. The operation from a time t31' to a time t33' may be similar to the operation from the time t31 to the time t33 illustrated in FIG. 10.

At a time t34', the signal level of the pulse CNT_EN is changed to H level. Thus, the counter 110 starts counting the clock pulse signal CNT_CLK. The count signal value increases in accordance with the count of the clock pulse signals CNT_CLK. The other operation at the time t34' may be similar to the operation at the operation at time t34 illustrated in FIG. 10.

At a time t35', the signal level of the comparison result signal CMP3 is changed from H level to L level. The latch control unit 10-2 changes the signal levels of the pulses CEN3 and CEN5 to L level. Thus, the latch units 20-3 and 20-5 hold the current count signals. The count signals held by the latch units 20-3 and 20-5 are digital signals DN3 based on the signal GN3 having the lowest signal amplitude among the signals GN1 to GN4.

At a time t36', the latch unit 20-2 holds a digital signal based on the signal GN2. At a time t37', the latch unit 20-1 holds a digital signal based on the signal GN1.

At a time t38', the signal level of the comparison result signal CMP4 is changed from H level to L level. The latch control unit 10-2 changes the signal levels of pulses CEN4 and CEN6 to L level. The latch units 20-4 and 20-6 hold the current count signal. The count signal held by the latch units 20-4 and 20-6 is a digital signal DN4 based on the signal GN4 having the highest signal amplitude among the signals GN1 to GN4.

At a time t39', the signal level of the pulse CNT_EN is changed to L level, and the counter 110 finishes counting the clock pulse signal CNT_CLK. The other operation may be similar to the operation at the time t39 illustrated in FIG. 10.

At a time t40', the signal level of the pulse CNT_RST is changed to H level. This operation may be performed in a period from the time t40' before a time t44', which will be described below. The other operation may be similar to the operation at the time t10 illustrated in FIG. 3. At a time t40', the signal level of the pulse MTRANS is changed to H level. Thus, the memories 30-1 to 30-6 hold the digital signals DN1 to DN4 held by the latch units 20-1 to 20-6, respectively. The operation of changing the signal level of the pulse MTRANS from L level to H level may be performed in a period from the time t40' before the time t44'. The other operation at the time t40' may be similar to the operation at the time t40 illustrated in FIG. 10.

The operations from the time t41' to the time t43' may be similar to the operations from the time t41 to the time t43 illustrated in FIG. 10.

At a time t44', the signal level of the pulse CNT_CLK is changed to H level, and the counter 110 starts counting the clock pulse signal CNT_CLK. The other operation at the time t44' may be similar to the operation at the time t44 illustrated in FIG. 10.

At a time t45', the signal level of the comparison result signal CMP3 is changed from H level to L level. The latch control unit 10-2 changes the signal levels of the pulses CEN3 and CEN5 to L level. Thus, the latch units 20-3 and 20-5 hold the current count signal. The count signal held by the latch units 20-3 and 20-5 is a digital signal based on the signal G(S+N)3 with the lowest signal amplitude among the signals G(S+N)1 to G(S+N)4. The digital signal will be called signal D(S+N)3.

At a time t46', the latch unit 20-2 holds a digital signal based on the signal G(S+N)2.

At a time t47', the latch unit 20-1 holds a digital signal based on the signal G(S+N)1.

At a time t48', the signal levels of the comparison result signal CMP4 is changed from H level to L level. The latch control unit 10-2 changes the signal levels of the pulses CEN4 and CEN6 to L level. Thus, the latch units 20-4 and 20-6 hold the current count signal. The count signal held by the latch unit 20-4, 20-6 is a digital signal based on the signal G(S+N)4 having the highest signal amplitude among the signals G(S+N)1 to G(S+N)4. The digital signal will be called a signal D(S+N)4. At a time t49', the signal level of the pulse CNT_CLK is changed to L level, and the counter 110 finishes counting the clock pulse signal CNT_CLK. The other operation may be similar to the operation at the time t49 illustrated in FIG. 10.

The operation at a time t50' may be similar to the operation at the time t50 illustrated in FIG. 10.

Through the operations above, the signal D(S+N)3, signal DN3, signal D(S+N)4, and signal DN4 may be acquired. The signal DS3 may be acquired by subtracting the signal DN3 from the signal D(S+N)3. The signal DS4 may be acquired by subtracting the signal DN4 from the signal D(S+N)4.

As described above, the image pickup apparatus exemplarily illustrate in FIG. 11 provides a similar effect to that of the image pickup apparatus exemplarily illustrated in FIG. 9.

The image pickup apparatus exemplarily illustrated in FIG. 11 may be configured as follows: In an image pickup apparatus having a plurality of columns of the pixels 100, comparators 8, and latch units 20, the pixels 100, comparators 8, and latch units 20 of the plurality of columns may be divided into a plurality of blocks. The latch units 20-5 and 20-6 may be provided in each of the blocks to implement the embodiment.

The image pickup apparatus exemplarily illustrated in FIG. 11 includes the latch units 20-5 and 20-6 which hold digital signals based on the highest value and lowest value of the pixel signals output by the plurality of pixels 100. The image pickup apparatus exemplarily illustrated in FIG. 11 is not limited to the embodiment but may include one of the latch units 20-5 and 20-6. A latch unit 20 may further be provided for holding a digital signal based on an intermediate value of pixel signals output by the plurality of pixels 100.

In the image pickup apparatus exemplarily illustrated in FIG. 11, the latch units 20-5 and 20-6 that are first holding units are disposed separately from the column of the plurality of comparators 8. However, the image pickup apparatus of this embodiment is not limited to the embodiment. In other words, second holding units may be provided correspondingly to the comparators 8, and a first holding unit may further be provided which holds a count signal based on a comparison result signal that the signal value changes at Nth. In other words, the first holding unit may be provided on the column having the second holding units, and the arrangement of the first holding unit is not limited.

One comparator 8 is provided for each of the columns having pixels 100 has been described herein according to the first embodiment and second embodiment. The image pickup apparatuses according to the first embodiment and second embodiment are not limited to the embodiments. In other words, one comparator 8 may be provided for a plurality of columns of pixels 100, or a plurality of comparators 8 may be provided for one column of pixels 100. Including these embodiments, an image pickup apparatus having a comparator 8 or comparators 8 correspondingly to a column or columns of pixels 100 may be implemented.

Third Embodiment

Figure 13:
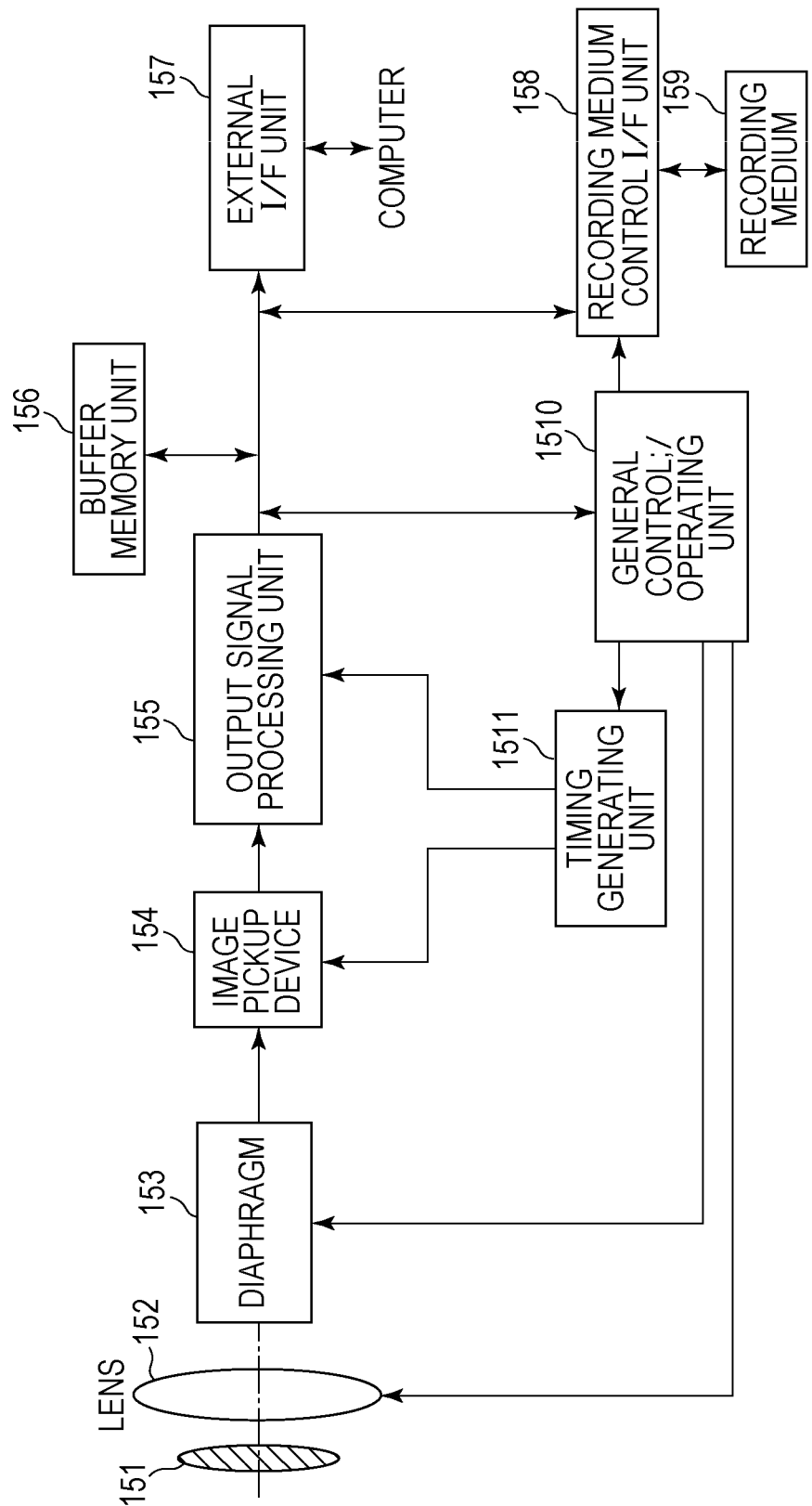
FIG. 13 is a block diagram of another example of an image pickup apparatus.

An embodiment will be described in which the aforementioned image pickup apparatus is applied to an image pickup system. The image pickup system may be a digital still camera, a digital camcoder or a monitoring camera. FIG. 13 illustrates a schematic diagram illustrating an example of an image pickup system in which the image pickup apparatus is applied to a digital still camera.

Referring to FIG. 13, the image pickup system includes a lens 152 which forms an optical image of a subject in an image pickup apparatus 154, a barrier 151 which protects the lens 152, and a diaphragm 153 which makes the quantity of light through the lens 152 variable. The image pickup system further includes an output signal processing unit 155 which processes an output signal from the image pickup apparatus 154.

The output signal processing unit 155 has a digital signal processing unit and performs an operation of performing a correction and/or a compression on a signal output from the image pickup apparatus 154 as required and outputs the resulting signal.

The image pickup system further includes a buffer memory unit 154 which temporarily stores image data, a storage medium control interface unit 158 which is used to write or read to or from a recording medium, and a detachable recording medium 159 such as a semiconductor memory to or from which image data is written or read. The image pickup system further includes an external interface unit 157 for communication with an external computer, for example, an overall control/calculation unit 1510 which overall controls calculations and the digital still camera, and a timing generating unit 1511 which outputs timing signals to the image pickup apparatus 154 and output signal processing unit 155. In this case, a timing signal may be externally input. The image pickup system may include at least the image pickup apparatus 154 and the output signal processing unit 155 which processes an output signal from the image pickup apparatus 154.

Thus, the image pickup system of this embodiment may perform an imaging operation by applying the image pickup apparatus 154.

Figure 14:
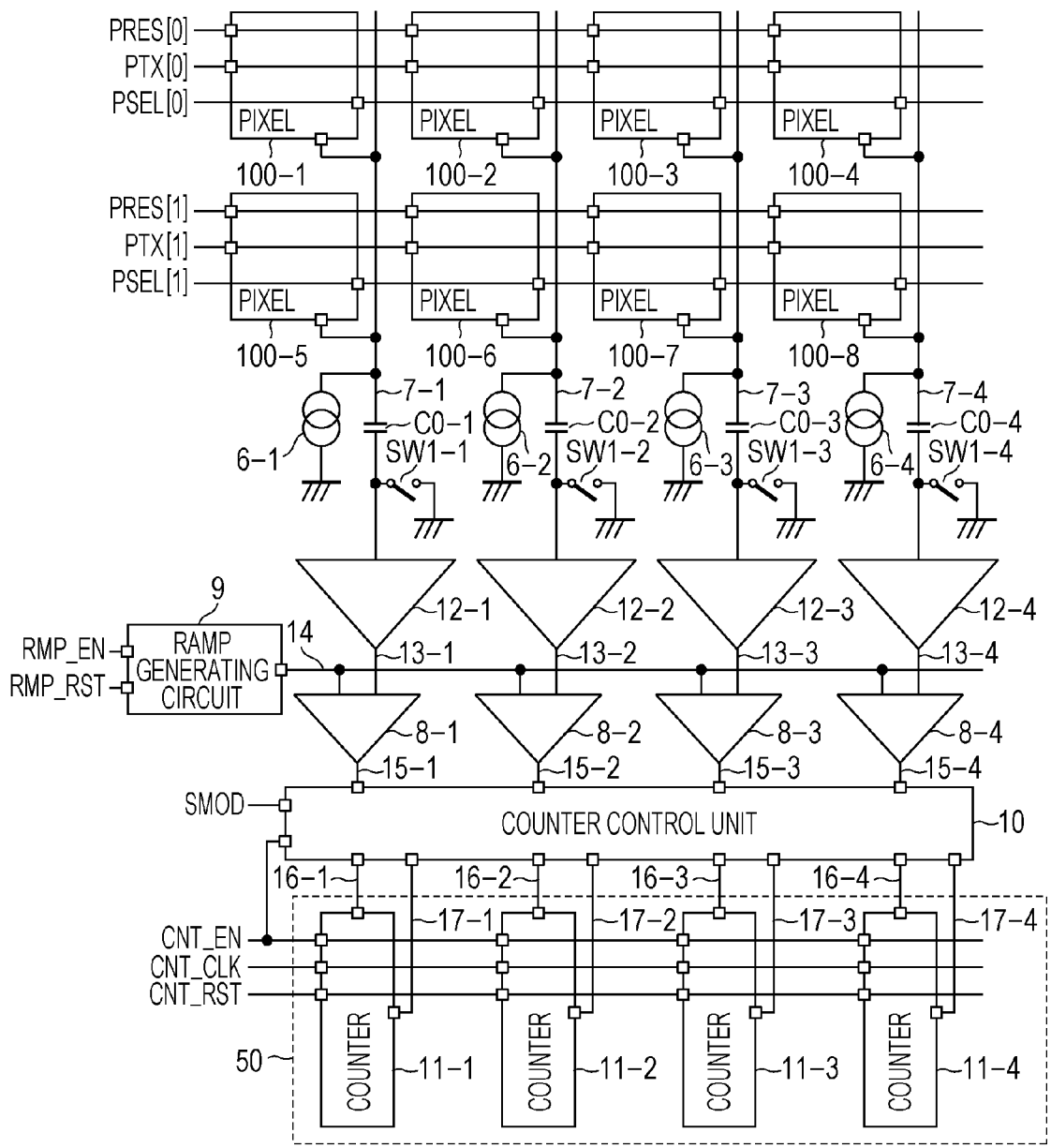
FIG. 14 is a block diagram of another example of an image pickup apparatus.
Figure 15:
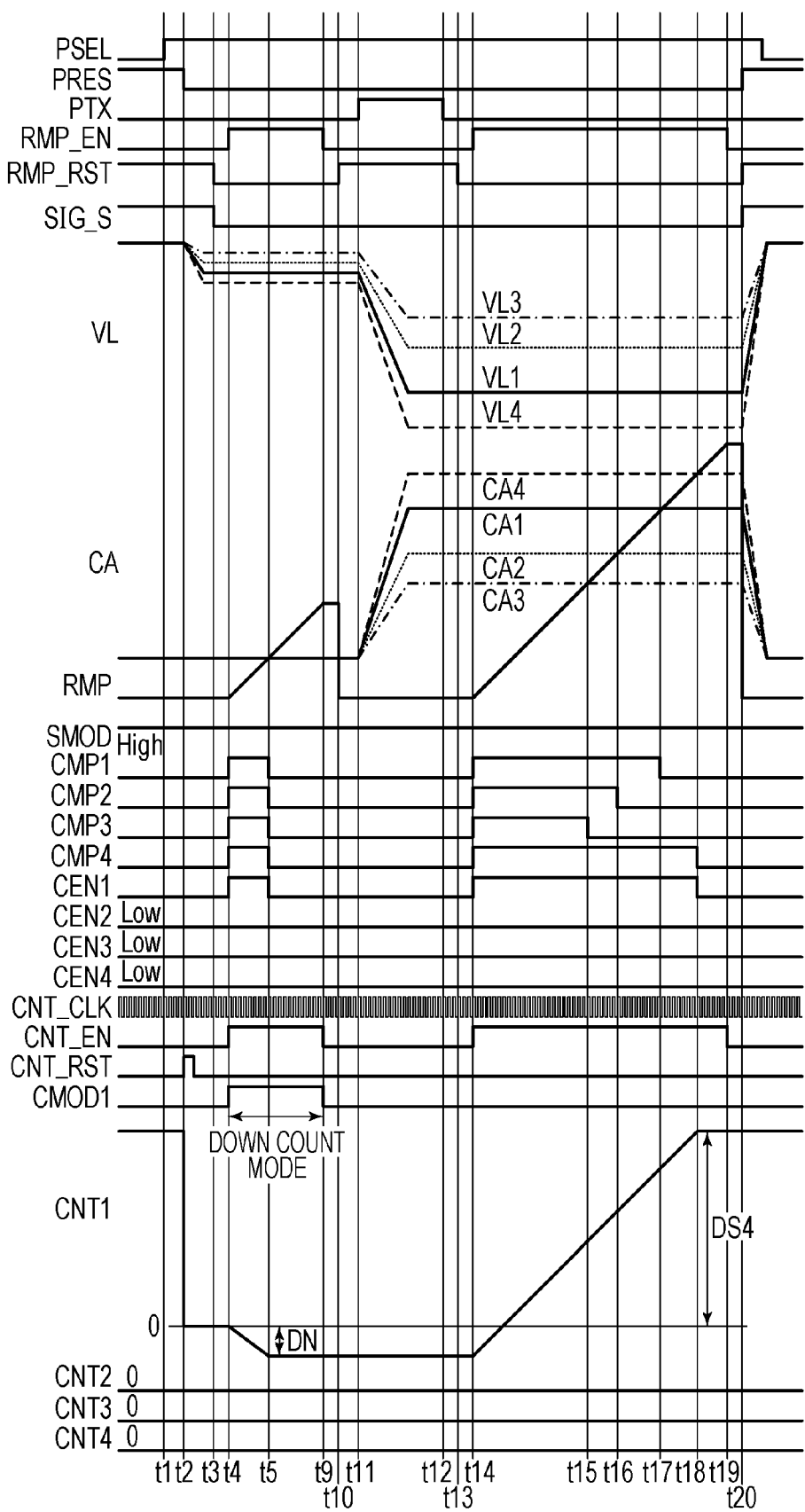
FIG. 15 is a timing chart of another example of an operation of an image pickup apparatus.

The expression "unit A and unit B are connected" herein means that unit A and unit B are electrically connected. In other words, it is not limited to a case that unit A and unit B are directly connected, but includes an element such as a resistance or capacitance is provided between unit A and unit B. For example, FIG. 14 illustrates an image pickup apparatus in which a capacitance C0 and a switch SW1 are provided on a vertical signal line 7. FIG. 15 illustrates an example of the operation of the image pickup apparatus. A difference from FIG. 3 will be mainly described. A pulse SIG_S controls the conduction/non-conduction of the switch SW1, the switch SW1 is brought into conduction if the signal level of the pulse SIG_S is at H level and is brought into non-conduction if it is at L level. The vertical signal line 7 from the pixel 100 to the capacitance C0 has a potential VL. In the period until time t3, the switch SW1 has a conductive state, and the charges in the capacitance C0 are reset. At a time t3, the switch SW1 is brought into non-conduction. Thus, the capacitance C0 holds a signal AN. If characteristics of the inverting amplifiers 12-1 to 12-4 and comparators 8-1 to 8-4 are identical, the comparison result signals CMP1 to CMP4 may change their signal values simultaneously. In other words, at a time t5, the signal values of the comparison result signals CMP1 to CMP4 change. At the time t5, the signal level of the pulse CEN1 is changed to L level. The counter 11-1 holds the count signal at the time t5.

The operations at the times t9 and t10 may be similar to the operations at the times t9 and t10, respectively, in FIG. 3.

At a time t11, when the signal level of the pulse PTX is changed to H level, the inverting amplifier 12 is given a signal AS that is a difference between signal A(S+N) and the signal AN. The comparator 8 is given the signal GS output by the inverting amplifier 12 on the basis of the signal AS. In a period from a time t14 to a time t18, the comparator 8 compares the signal GS and the ramp signal RMP.

The other operations from a time t11 to a time t18 may be similar to the operations from the time t11 to the time t18 illustrated in FIG. 3.

The operation at a time t19 may be similar to the operation at the time t19 in FIG. 3.

At a time t20, the signal level of the pulse SIG_S is changed to H level. The other operation may be similar to the operation at the time t20 illustrated in FIG. 3.

Also in the image pickup apparatus exemplarily illustrated in FIG. 14, a digital signal based on a comparison result signal CMP that changes the signal value at Nth (where N is an integer of 1 or higher) may be acquired by a comparison operation between the signal GS and the ramp signal RMP. Thus, similar effects to those of the first embodiment may be acquired.

The inverting amplifier 12 may include a differential amplifier and a feedback capacitance and may amplify an input signal with an amplification factor depending on the capacitance value ratio between the capacitance C0 and the feedback capacitance. In this case, the SW1-1 may connect between an inverting input terminal and an output terminal of the inverting amplifier.

While the present invention has been described with reference to exemplary embodiments, it is to be understood that the invention is not limited to the disclosed exemplary embodiments. The scope of the following Claims is to be accorded the broadest interpretation so as to encompass all such modifications and equivalent structures and functions.

This application claims the benefit of Japanese Patent Application No. 2012-111864, filed May 15, 2012, which is hereby incorporated by reference herein in its entirety.

What is claimed is:

1. An image pickup apparatus comprising:
   a plurality of pixels which are arranged in a matrix form and each pixel outputs a pixel signal;
   a plurality of comparators which are provided correspondingly to columns of the matrix, each comparator is configured to output a comparison result signal having a signal value resulting from a comparison between a signal based on the pixel signal and a signal having a potential that changes depending on time; and
   a holding unit which holds a digital signal corresponding to the pixel signal having an Nth largest amplitude where N is an integer of 1 or higher among the pixel signals of the plurality of pixels based on the comparison result signal that changes the signal value at the Nth among the comparison result signals, and that is detected by comparing the comparison result signals output by the plurality of comparators.

2. An image pickup apparatus comprising:
   a plurality of pixels which are arranged in a matrix form and each pixel outputs a pixel signal;
   a plurality of comparators which are provided correspondingly to columns of the matrix, each comparator is configured to output a comparison result signal having a signal value resulting from a comparison between a signal based on the pixel signal and a signal having a potential that changes depending on time;
   a holding unit which holds a digital signal acquired by counting a clock pulse signal; and
   a control unit which causes the holding unit to hold the digital signal corresponding to the pixel signal having an Nth largest amplitude where N is an integer of 1 or higher among the pixel signals of the plurality of pixels based on the comparison result signal that changes the signal value at the Nth among the comparison result signals, and that is detected by comparing the comparison result signals output by the plurality of comparators.

3. The image pickup apparatus according to claim 2, wherein the control unit is provided on a path from the plurality of comparators to the holding unit.

4. The image pickup apparatus according to claim 1, wherein
   the holding unit includes
   a first holding unit which holds the digital signal based on the comparison result signal that changes the signal value at the Nth, and that is detected by comparing the comparison result signals output by the plurality of comparators; and
   a plurality of second holding units; and
   each of the plurality of second holding units is provided correspondingly to each of the columns of the pixels.

5. The image pickup apparatus according to claim 4, wherein
   the first holding unit includes
   the holding unit which holds the digital signal based on the comparison result signal that changes the signal value at least among the comparison result signals, and that is detected by comparing the comparison result signals output by the plurality of comparators; and
   the holding unit which holds the digital signal based on the comparison result signal that changes the signal value at first among the comparison result signals, and that is detected by comparing the comparison result signals output by the plurality of comparators.

6. The image pickup apparatus according to claim 1, wherein the holding unit is a counter which generates the digital signal acquired by counting the clock pulse signal.

7. The image pickup apparatus according to claim 6, wherein
   the holding unit includes:
   a first counter which holds the digital signal based on the comparison result signal that changes the signal value at Nth; and
   a plurality of second counters, each of the plurality of second counters is provided correspondingly to each of the plurality of comparators; and
   during a period while the first counter is counting the clock pulse signal, the plurality of second counters do not perform an operation of counting the clock pulse signal.

8. The image pickup apparatus according to claim 2, wherein
   the holding unit is a counter which generates the digital signal acquired by counting the clock pulse signal;
   the holding unit includes:
   a first counter which holds the digital signal based on the comparison result signal that changes the signal value at Nth, and a plurality of second counters, each of the plurality of second counters is provided correspondingly to each of the plurality of comparators; and during a period while the first counter is counting the clock pulse signal, the plurality of second counters do not perform an operation of counting the clock pulse signal.

9. The image pickup apparatus according to claim 6, wherein each of the plurality of pixels includes:

a photoelectric conversion unit which generates signal charges based on the incident light; and an amplification transistor which outputs a photoelectric conversion signal amplified based on the signal charges;

the pixel signal contains a noise level signal and the photoelectric conversion signal;

the comparator performs a first comparison between the signal based on the noise level signal and a ramp signal and a second comparison between the signal based on the photoelectric conversion signal and the ramp signal;

the counter counts the clock pulse signal based on one of an increase and a decrease of a signal value of the digital signal in the first comparison and counts the clock pulse signals based on the other of an increase or a decrease of a signal value of the digital signal in the second comparison.

10. The image pickup apparatus according to claim 8, wherein each of the plurality of pixels includes:

a photoelectric conversion unit which generates signal charges based on the incident light; and an amplification transistor which outputs a photoelectric conversion signal amplified based on the signal charges;

the pixel signal contains a noise level signal and the photoelectric conversion signal;

the comparator performs a first comparison between the signal based on the noise level signal and a ramp signal and a second comparison between the signal based on the photoelectric conversion signal and the ramp signal;

the counter counts the clock pulse signal based on one of an increase and a decrease of a signal value of the digital signal in the first comparison and counts the clock pulse signals based on the other of an increase and decrease of a signal value of the digital signal in the second comparison.

11. The image pickup apparatus according to claim 1, further comprising a counter which generates the digital signal by counting the clock pulse signal, wherein the holding unit is a latch unit which holds the digital signal based on the change at the signal value in the comparison result signal.

12. The image pickup apparatus according to claim 1, wherein the signal based on the pixel signal is a signal output by an inverting amplifier which inverts and amplifies the pixel signal and outputs it.

13. An image pickup system comprising the image pickup apparatus according to claim 1 and a signal processing unit which processes a signal output by the image pickup apparatus.

14. An image pickup system comprising the image pickup apparatus according to claim 2 and a signal processing unit which processes a signal output by the image pickup apparatus.

15. A method for driving an image pickup apparatus including:

a plurality of pixels which are arranged in a matrix form and each pixel outputs a pixel signal;

a plurality of comparators which are provided correspondingly to columns of the matrix, each comparator is configured to output comparison result signals each having a signal value resulting from a comparison between a signal based on the pixel signal and a signal having a potential that changes depending on time; and a holding unit which holds a digital signal acquired by counting clock pulse signals, the method comprising causing the holding unit to hold a count signal which is the digital signal corresponding to the pixel signal having an Nth largest amplitude where N is an integer of 1 or higher among the pixel signals of the plurality of pixels, and which is a signal acquired by counting a clock pulse signal, based on the comparison result signal that changes the signal value at the Nth among the comparison result signals, and that is detected by comparing the comparison result signals output by the plurality of comparators.

16. The method for driving the image pickup apparatus according to claim 15, in which the holding unit further has a first holding unit and a plurality of second holding units;

each of the plurality of second holding units is arranged corresponding to each of the plurality of comparators, the driving method further comprising:

causing the first holding unit to hold the count signal based on the comparison result signal that changes the signal value at the Nth among the comparison result signals, and that is detected by comparing the comparison result signals output by the plurality of comparators; and causing each of the second holding units to hold the count signal based on the comparison result signals output by the comparator at the column corresponding to the second holding unit.

17. The method for driving the image pickup apparatus according to claim 16, wherein after the first holding unit is caused to output the digital signal, the second holding units are caused to output the digital signals.

* * * * *